US009584227B2

(12) United States Patent
Wiley

(10) Patent No.: US 9,584,227 B2
(45) Date of Patent: Feb. 28, 2017

(54) LOW-POWER MODE SIGNAL BRIDGE FOR OPTICAL MEDIA

(71) Applicant: QUALCOMM Incorporated, San Diego, CA (US)

(72) Inventor: George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/802,408

(22) Filed: Jul. 17, 2015

(65) Prior Publication Data

US 2017/0019186 A1    Jan. 19, 2017

(51) Int. Cl.
*H04B 10/80* (2013.01)
*H04L 29/06* (2006.01)

(52) U.S. Cl.
CPC ........... *H04B 10/801* (2013.01); *H04L 69/08* (2013.01); *H04L 69/18* (2013.01)

(58) Field of Classification Search
CPC .................................................... H04B 10/801
See application file for complete search history.

(56) References Cited

U.S. PATENT DOCUMENTS

| 7,671,628 | B2 | 3/2010 | Alameh et al. |
| 7,787,387 | B2 | 8/2010 | Huff |
| 8,621,128 | B2 | 12/2013 | Radulescu et al. |
| 2013/0073749 | A1 | 3/2013 | Tremblay et al. |
| 2013/0230318 | A1* | 9/2013 | Kim ........................ H04B 10/25 398/43 |
| 2015/0043674 | A1 | 2/2015 | Blon et al. |
| 2015/0201052 | A1* | 7/2015 | Li ........................ H04M 1/0266 455/566 |

FOREIGN PATENT DOCUMENTS

DE    102007011176 A1    9/2008

OTHER PUBLICATIONS

International Search Report and Written Opinion—PCT/US2016/038248—ISA/EPO—Sep. 1, 2016.

* cited by examiner

*Primary Examiner* — Shi K Li
(74) *Attorney, Agent, or Firm* — Loza & Loza, LLP

(57) ABSTRACT

System, methods and apparatus are described that facilitate transmission of data between two devices. A data transfer method includes receiving first data from a first interface, the first data being received in signaling transmitted by a first device according to a first protocol, determining a mode of operation for a communication link to be used for transmitting the first data to a second device, transmitting the first data to the second device over an optical path of the communication link in a first mode of operation, transmitting the first data in accordance with the first protocol to the second device over an electrical path of the communication link in a second mode of operation, and in a third mode of operation, translating the first data to obtain second data, and transmitting the second data in accordance with a second protocol to the second device over the electrical path.

28 Claims, 24 Drawing Sheets

LOW-POWER MODE SIGNAL BRIDGE FOR OPTICAL MEDIA

BACKGROUND

Field

At least one aspect generally relates to high-speed data communications interfaces, and more particularly, extending the range of standards-defined interfaces used for communicating between integrated circuit devices.

Background

Manufacturers of mobile devices, such as cellular phones, may obtain components of the mobile devices from various sources, including different manufacturers. For example, the application processor in a cellular phone may be obtained from a first manufacturer, while the display for the cellular phone may be obtained from a second manufacturer. Moreover, multiple standards are defined for interconnecting certain components of the mobile devices. For example, there are multiple types of interface defined for communications between an application processor and display and camera components of a mobile device. Some components employ an interface that conforms to one or more standards specified by the Mobile Industry Processor Interface (MIPI) Alliance. For example, the MIPI Alliance defines protocols for a camera serial interface (CSI) and a display serial interface (DSI).

MIPI CSI-2 and MIPI DSI or DSI-2 standards define a wired interface between a camera and application processor, or an application processor and display. The low-level physical-layer (PHY) interface in each of these applications can be MIPI C-PHY or MIPI D-PHY. Optical media can be used to extend the range of the MIPI C-PHY or D-PHY physical layers. However, some interfaces require that bidirectional and/or low-power modes of operation be implemented, neither of which requirements can be met by a conventional optical interface, which is unidirectional by nature.

Accordingly an improved range-extending interface is needed.

SUMMARY

Embodiments disclosed herein provide systems, methods and apparatus that enable an application processor to communicate with a display using any of a plurality of interface standards bidirectionally, and in a low-power mode. According to certain aspects described herein, two or more Integrated Circuit (IC) devices may be collocated in an electronic apparatus and communicatively coupled through one or more data links that can be configured with one of a plurality of interface standards.

In an aspect of the disclosure, a data transfer method operational on one of two devices in an apparatus includes receiving first data from a first interface, the first data being received in signaling transmitted by a first device in accordance with a first protocol, determining a mode of operation for a communication link to be used for transmitting the first data to a second device, where the communication link includes an optical path and an electrical path, transmitting the first data to the second device over the optical path in a first mode of operation, transmitting the first data in accordance with the first protocol to the second device over the electrical path in a second mode of operation, and in a third mode of operation, translating the first data to obtain second data, and transmitting the second data in accordance with a second protocol to the second device over the electrical path.

In an aspect of the disclosure, an apparatus has an optical medium used for communicating information carried on optical signals, a first integrated circuit (IC) device coupled to the optical medium and adapted to transmit the optical signals, a second IC device coupled to the optical medium and adapted to receive the optical signals, and an electrical path that includes a plurality of electrical connectors coupling the first IC device and the second IC device. The first IC device and the second IC device include a bridge circuit configured to receive first data from a first interface, the first data being received in signaling transmitted by the first IC device in accordance with a first protocol, determine a mode of operation for communicating between the first IC device and the second IC device, transmit the first data to the second IC device over the optical medium in a first mode of operation, transmit the first data in accordance with the first protocol to the second IC device using two or more of the plurality of electrical connectors in a second mode of operation, and in a third mode of operation, translate the first data to obtain second data, and transmit the second data in accordance with a second protocol to the second IC device using the plurality of electrical connectors.

In an aspect of the disclosure, a bridge circuit includes means for communicating first information in optical signals through an optical medium, including a first interface circuit coupled to the optical medium, means for communicating second information in electrical signals through a plurality of electrical connectors, including a second interface circuit coupled to the plurality of electrical connectors, means for selectively coupling one or more sources of input data with the first interface circuit and the second interface circuit, including a processing circuit. The processing circuit may be configured to receive first data encoded in accordance with a first protocol, determine a mode of operation for communicating the first data, transmit the first data over the optical medium in a first mode of operation, transmit the first data in accordance with the first protocol using two or more of the plurality of electrical connectors in a second mode of operation, and in a third mode of operation, translate the first data to obtain second data, and transmit the second data in accordance with a second protocol using the plurality of electrical connectors.

In an aspect of the disclosure, a processor readable storage medium may have code stored thereon. The code may include instructions for receiving first data from a first interface, the first data being received in signaling transmitted by a first device in accordance with a first protocol, determining a mode of operation for a communication link to be used for transmitting the first data to a second device, where the communication link includes an optical path and an electrical path, transmitting the first data to the second device over the optical path in a first mode of operation, transmitting the first data in accordance with the first protocol to the second device over the electrical path in a second mode of operation, and in a third mode of operation translating the first data to obtain second data, and transmitting the second data in accordance with a second protocol to the second device over the electrical path.

DETAILED DESCRIPTION

Figure 1:
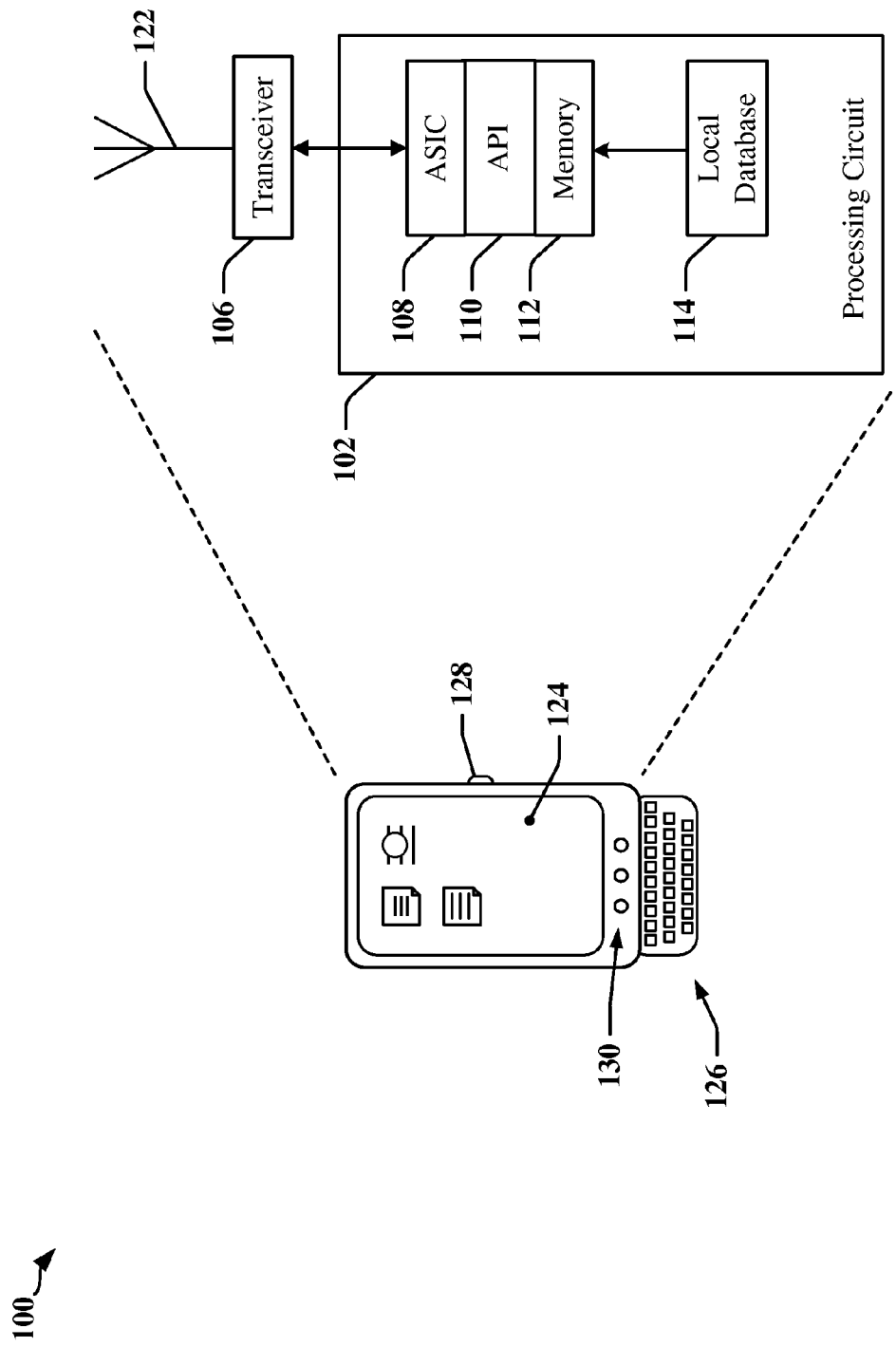
FIG. 1 depicts an apparatus employing a data link between integrated circuit (IC) devices that selectively operates according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of data communication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include read-only memory (ROM) or random-access memory (RAM), electrically erasable programmable ROM (EEPROM), including ROM implemented using a compact disc (CD) or other optical disk storage, magnetic disk storage or other magnetic storage devices, or any other medium that can be used to carry or store desired program code in the form of instructions or data structures and that can be accessed by a computer. Disk and disc, as used herein, includes CD, laser disc, optical disc, digital versatile disc (DVD), and floppy disk where disks usually reproduce data magnetically, while discs reproduce data optically with lasers. Combinations of the above should also be included within the scope of computer-readable media.

FIG. 1 depicts an apparatus 100 that may employ a communication link between IC devices. In one example, the apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as a memory device 112 that can store and maintain data and instructions for execution or other use by the processing circuit 102. The processing circuit 102 may be controlled by one or more of an operating system and an application programming interface (API) 110 layer that supports and enables execution of software modules residing in storage media, such as the memory device 112 of the wireless device. The memory device 112 may include ROM or RAM, EEPROM, flash cards, or any memory device that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, EEPROM, optical media, tape, soft or hard disk, or the like. The processing circuit may also be operably coupled to external devices such as an antenna 122, a display 124, operator controls, such as a button 128 and a keypad 126 among other components.

Figure 2:
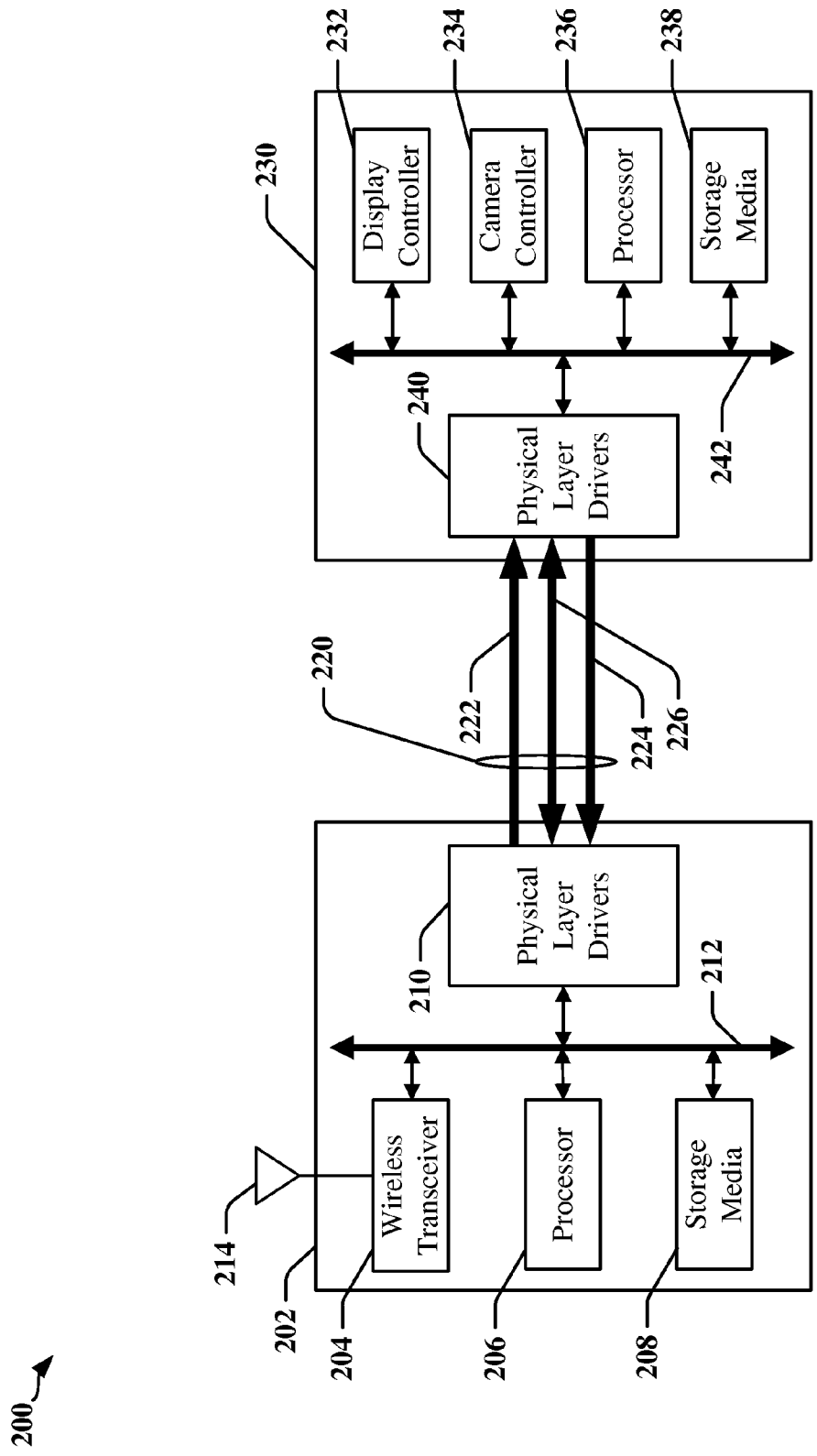
FIG. 2 illustrates a system architecture for an apparatus employing a data link between IC devices.

FIG. 2 is a block schematic diagram illustrating certain aspects of an apparatus 200 such as a mobile apparatus that employs a communication link 220 to connect various subcomponents. In one example, the apparatus 200 includes a plurality of IC devices 202 and 230 that exchange data and control information through the communication link 220. The communication link 220 may be used to connect IC devices 202 and 230 that are located in close proximity to one another, or physically located in different parts of the apparatus 200. In one example, the communication link 220 may be provided on a chip carrier, substrate or circuit board that carries the IC devices 202 and 230. In another example, a first IC device 202 may be located in a keypad section of a mobile computing device while a second IC device 230 may be located in a display section of mobile computing device. In another example, a portion of the communication link 220 may include a cable or optical connection.

The communication link 220 may provide multiple channels 222, 224 and 226. One or more channels 226 may be bidirectional, and may operate in half-duplex and/or full-duplex modes. One or more channels 222 and 224 may be unidirectional. The communication link 220 may be asymmetrical, providing higher bandwidth in one direction. In one example described herein, a first communications channel 222 may be referred to as a forward channel 222 while a second communications channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the communications channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each have a processor or other processing and/or computing circuit or device 206, 236. In one example, the first IC device 202 may perform core functions of the apparatus 200, including maintaining wireless communications through a wireless transceiver 204 and an antenna 214, while the second IC device 230 may support a user interface that manages or operates a display controller 232. In the example, the second IC device 230 may be adapted to control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more bus 212 and 242, respectively.

The reverse channel 224 may be operated in the same manner as the forward channel 222, and the forward link 222 and reverse channel 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional channel 226 may support communications between the first IC device 202 and the second IC device 230. The forward channel 222 and/or reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

In some instances, the forward and reverse channels 222 and 224 may be configured or adapted to support a wide video graphics array (WVGA) 80 frames per second LCD driver IC without a frame buffer, delivering pixel data at 810 Mbps for display refresh. In another example, the forward and reverse channels 222 and 224 may be configured or adapted to enable communications between with dynamic random access memory (DRAM), such as double data rate synchronous dynamic random access memory (SDRAM). The drivers 210, 240 may include encoding devices that can be configured to encode multiple bits per clock transition, and multiple sets of wires can be used to transmit and receive data from the SDRAM, control signals, address signals, and other signals.

The forward and reverse channels 222 and 224 may comply with, or be compatible with application-specific industry standards. In one example, the MIPI standard defines physical layer interfaces between an application processor IC device 202 and an IC device 230 that supports the camera or display in a mobile device. The MIPI standard includes specifications that govern the operational characteristics of products that comply with MIPI specifications for mobile devices. In some instances, the MIPI standard may define interfaces that employ complimentary metal-oxide-semiconductor (CMOS) parallel busses.

The MIPI Alliance defines standards and specifications that may address communications affecting all aspects of operations in a mobile device, including the antenna, peripherals, the modem and application processors. For example, the MIPI Alliance defines protocols for a camera serial interface (CSI) and a display serial interface (DSI). The MIPI CSI-2 defines a wired interface between a camera and Application Processor and the MIPI DSI or DSI-2 defines a wired interface between an Application Processor and a display. The low-level physical layer (PHY) interface in each of these applications can be MIPI C-PHY or MIPI D-PHY.

MIPI C-PHY Interface

According to certain aspects disclosed herein, systems and apparatus may employ multi-phase data encoding and decoding interface methods for communicating between IC devices 202 and 230. A multi-phase encoder may drive a plurality of conductors (i.e., M conductors). The M conductors typically include three or more conductors, and each conductor may be referred to as a wire, although the M conductors may include conductive traces on a circuit board or within a conductive layer of a semiconductor IC device. In one example, the MIPI Alliance-defined "C-PHY" physical layer interface technology may be used to connect camera and display devices 230 to an application processor device 202. The C-PHY interface employs three-phase symbol encoding to transmit data symbols on 3-wire lanes, or "trios" where each trio includes an embedded clock.

The M conductors may be divided into a plurality of transmission groups, each group encoding a portion of a block of data to be transmitted. An N-phase encoding scheme is defined in which bits of data are encoded in phase transitions and polarity changes on the M conductors. Decoding does not rely on independent conductors or pairs of conductors and timing information can be derived directly from phase and/or polarity transitions in the M conductors. N-Phase polarity data transfer can be applied to any physical signaling interface, including electrical, optical and radio frequency (RF) interfaces.

In the C-PHY example, a three-phase encoding scheme for a three-wire system may define three phase states and two polarities, providing 6 states and 5 possible transitions from each state. Deterministic voltage and/or current changes may be detected and decoded to extract data from the three wires.

Figure 3:
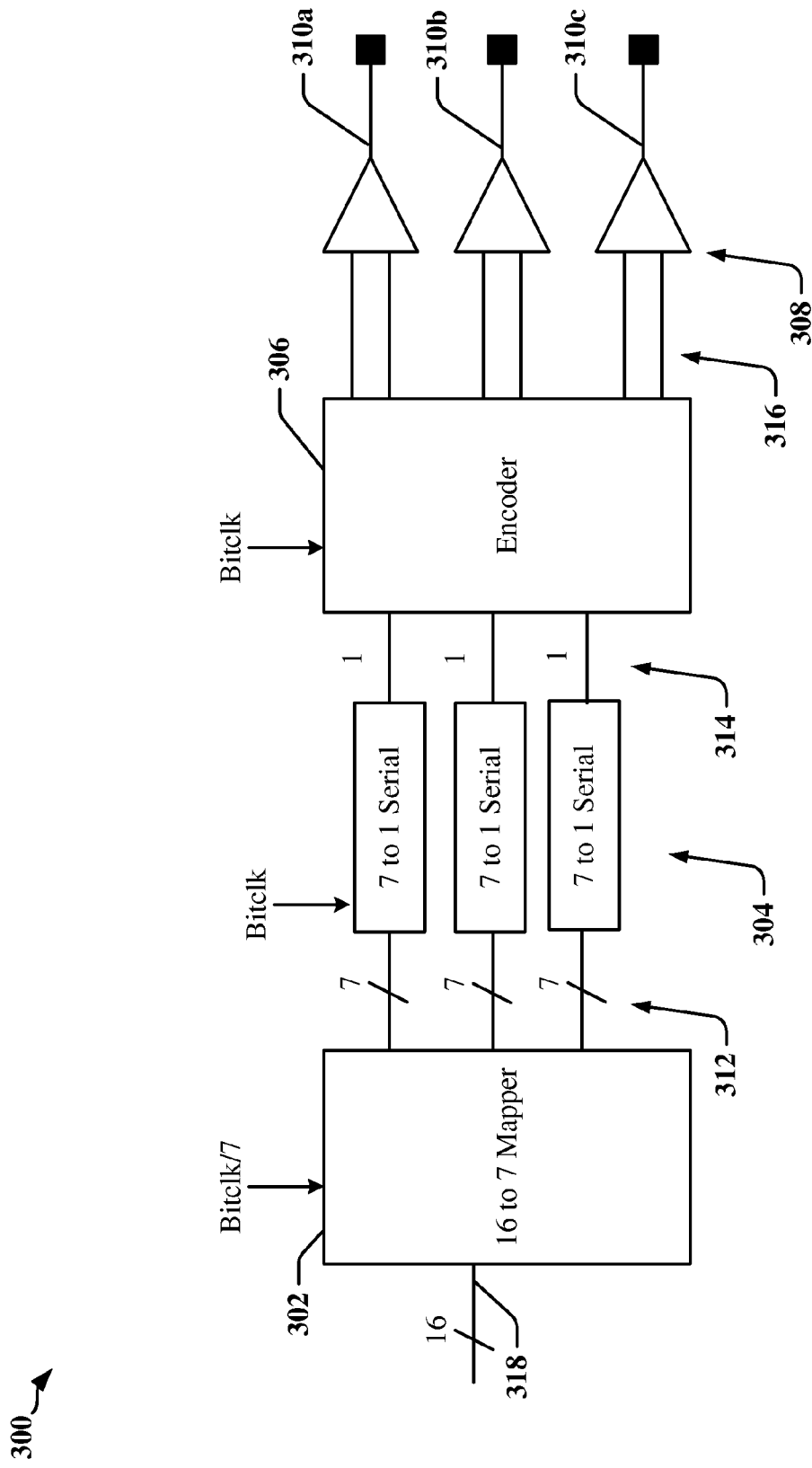
FIG. 3 illustrates an example of a 3-phase polarity data encoder.

FIG. 3 is a schematic diagram illustrating the use of N-phase polarity encoding to implement certain aspects of the communication link 220 depicted in FIG. 2. The illustrated example may relate to a three-wire link or to a portion of a link that has more than three wires. The communication link 220 may include a wired bus having a plurality of signal wires, which may be configured to carry three-phase encoded data in a high-speed digital interface, such as a mobile display digital interface (MDDI). One or more of the channels 222, 224 and 226 may be configured or adapted to use three-phase polarity encoding. The physical layer drivers 210 and 240 may be adapted to encode and decode three-phase polarity encoded data transmitted on link 220. The use of 3-phase polarity encoding provides for high speed data transfer and may consume half or less of the power of other interfaces because fewer than 3 drivers are active in 3-phase polarity encoded data links 220 at any time. 3-phase polarity encoding circuits in the physical layer drivers 210 and/or 240 can encode multiple bits per transition on the communications link 220. In one example, a combination of three-phase encoding and polarity encoding may be used to support a wide video graphics array (WVGA), 80 frames per second LCD driver IC without a frame buffer, delivering pixel data for display refresh at 810 Mbps over three or more wires.

In the depicted C-PHY example 300, an M-wire, N-phase polarity encoding transmitter is configured for M=3 and N=3. The example of three-wire, three-phase encoding is selected solely for the purpose of simplifying descriptions of certain aspects of this disclosure. The principles and techniques disclosed for three-wire, three-phase encoders can be applied in other configurations of M-wire, N-phase polarity encoders, and may comply or be compatible with other interface standards.

When three-phase polarity encoding is used, connectors such as signal wires 310a, 310b and 310c on a 3-wire bus may be undriven, driven positive, or driven negative. An undriven signal wire 310a, 310b or 310c may be in a high-impedance state. An undriven signal wire 310a, 310b or 310c may be driven or pulled to a voltage level that lies substantially halfway between the positive and negative voltage levels provided on driven signal wires. An undriven signal wire 310a, 310b or 310c may have no current flowing through it. In the example 300, each signal wire 310a, 310b and 310c may be in one of three states (denoted as +1, −1, or 0) using drivers 308. In one example, drivers 308 may include unit-level current-mode drivers. In another example, drivers 308 may drive opposite polarity voltages on two signals transmitted on the signal wires 310a and 310b while the third signal wire 310c is at high impedance and/or pulled to ground. For each transmitted symbol interval, at least one signal is in the undriven (0) state, while the number of signals driven positive (+1 state) is equal to the number of signals driven negative (−1 state), such that the sum of current flowing to the receiver is always zero. For each symbol, the state of at least one signal wire 310a, 310b or 310c is changed from the symbol transmitted in the preceding transmission interval.

In the example, 300, a mapper 302 may receive 16 bit data 318, and the mapper 302 may map the input data 318 to 7 symbols 312 for transmitting sequentially over the signal wires 310a, 310b and 310c. An M-wire, N-phase encoder 306 configured for three-wire, three-phase encoding receives the 7 symbols 312 produced by the mapper one symbol 314 at a time and computes the state of each signal wire 310a, 310b and 310c for each symbol interval, based on the immediately preceding state of the signal wires 310a, 310b and 310c. The 7 symbols 312 may be serialized using parallel-to-serial converters 304, for example. The encoder 306 selects the states of the signal wires 310a, 310b and 310c based on the input symbol 314 and the previous states of signal wires 310a, 310b and 310c.

The use of M-wire, N-phase encoding permits a number of bits to be encoded in a plurality of symbols where the bits per symbol is not an integer. In the simple example of a three-wire, three-phase system, there are 3 available combinations of 2 wires, which may be driven simultaneously, and 2 possible combinations of polarity on any pair of wires that is driven simultaneously, yielding 6 possible states. Since each transition occurs from a current state, 5 of the 6 states are available at every transition. The state of at least one wire is typically required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encodes five states has $5^7$ (78,125) permutations. Accordingly, the 7 symbols may be used to encode the $2^{16}$ (65,536) permutations of 16 bits.

Figure 4:
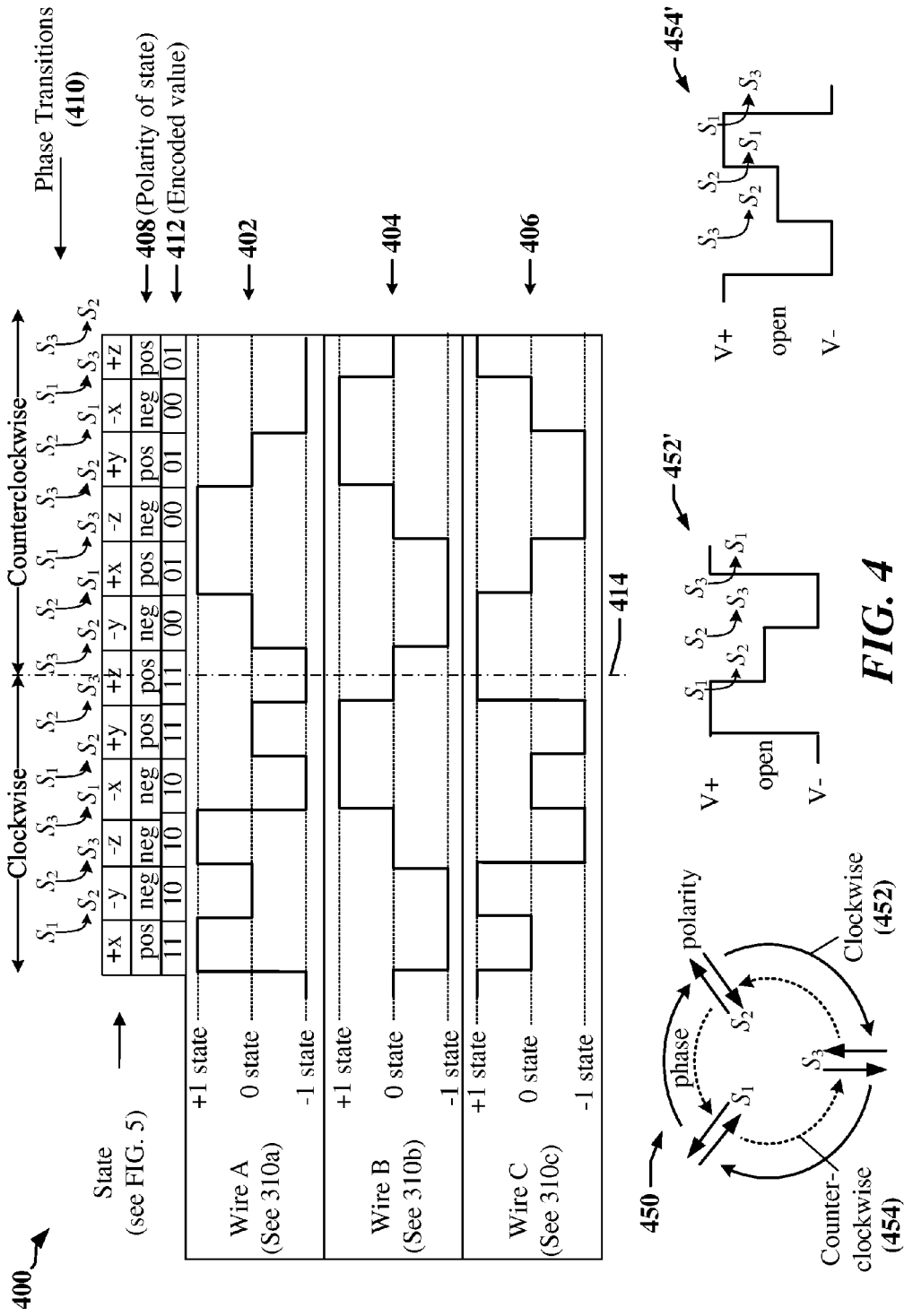
FIG. 4 illustrates signaling in an example of a 3-phase polarity encoded interface.

FIG. 4 illustrates an example of signaling 400 employing a three-phase modulation data-encoding scheme based on the circular state transition diagram 450. According to the data-encoding scheme, a three-phase signal may rotate in two directions and may be transmitted on three signal wires 310a, 310b and 310c. Each of the three signals is independently driven on the signal wires 310a, 310b, 310c. Each of the three signals includes the three-phase signal, with each signal being 120 degrees out of phase relative to the other two signals. At any point in time, each of the three signal wires 310a, 310b, 310c is in a different one of the states {+1, 0, −1}. At any point in time, each of the three signal wires 310a, 310b, 310c in a 3-wire system is in a different state than the other two wires. When more than three conductors or wires are used, two or more pairs of wires may be in the same state. The illustrated encoding scheme may also encode information in the polarity of the two signal wires 310a, 310b and/or 310c that are actively driven to the +1 and −1 states. Polarity is indicated at 408 for the sequence of states depicted.

At any phase state in the illustrated three-wire example, exactly two of the signal wires 310a, 310b, 310c carry a signal which is effectively a differential signal for that phase state, while the third signal wire 310a, 310b or 310c is undriven. The phase state for each signal wire 310a, 310b, 310c may be determined by voltage difference between the signal wire 310a, 310b or 310c and at least one other signal wire 310a, 310b and/or 310c, or by the direction of current flow, or lack of current flow, in the signal wire 310a, 310b or 310c. As shown in the state transition diagram 450, three phase states ($S_1$, $S_2$ and $S_3$) are defined. A signal may flow clockwise from phase state $S_1$ to phase state $S_2$, phase state $S_2$ to phase state $S_3$, and/or phase state $S_3$ to phase state $S_1$ and the signal may flow counter-clockwise from phase state $S_1$ to phase state $S_3$, phase state $S_3$ to phase state $S_2$, and/or phase state $S_2$ to phase state $S_1$. For other values of N, transitions between the N states may optionally be defined according to a corresponding state diagram to obtain circular rotation between state transitions.

In the example of a three-wire, three-phase communications link, clockwise rotations ($S_1$ to $S_2$), ($S_2$ to $S_3$), and/or ($S_3$ to $S_1$) at a state transition 410 may be used to encode a logic 1, while counter-clockwise rotations ($S_1$ to $S_3$), ($S_3$ to $S_2$), and/or ($S_2$ to $S_1$) at the state transition 410 may be used to encode a logic 0. Accordingly a bit may be encoded at each transition by controlling whether the signal is "rotating" clockwise or counter-clockwise. For example, a logic 1 may be encoded when the three signal wires 310a, 310b, 310c transition from phase state $S_1$ to phase state $S_2$ and a logic 0 may be encoded when the three signal wires 310a, 310b, 310c transition from phase state $S_1$ to phase state $S_3$. In the simple three-wire example depicted, direction of rotation may be easily determined based on which of the three signal wires 310a, 310b, 310c is undriven before and after the transition.

Information may also be encoded in the polarity and/or changes of polarity of state 408 of the driven conductors 310a, 310b, 310c, or in the direction of current flow or changes in the direction of current flow between two signal wires 310a, 310b, 310c. Signals 402, 404, and 406 illustrate voltage levels applied to signal wires 310a, 310b, 310c, respectively at each phase state in a three-wire, three-phase link. At any time, a first signal wire 310a, 310b, 310c is coupled to a more positive voltage (+V, for example), a second signal wire 310a, 310b, 310c is coupled to a more negative voltage (−V, for example), while the third signal wire 310a, 310b, 310c may be open-circuited. As such, one polarity encoding state may be determined by the current flow between the first and second signal wires 310a, 310b, 310c or the voltage polarities of the first and second signal wires 310a, 310b, 310c. In some embodiments, two bits of data 412 may be encoded in each state transition 410. A decoder may determine the direction of signal phase rotation to obtain the first bit. The second bit may be determined based on the polarity difference between two of the signals 402, 404 and 406. In some instances, the second bit may be determined based on a change or lack of change in polarity of the differential signal transmitted on a pair of the signal wires 310a, 310b, 310c. The decoder having determined direction of rotation can determine the phase state and the polarity of the voltage applied between the two active signal wires 310a, 310b and/or 310c, or the direction of current flow through the two active signal wires 310a, 310b and/or 310c.

In the example of the three-wire, three-phase link described herein, one bit of data may be encoded in the rotation, or phase change in the three-wire, three-phase link, and an additional bit may be encoded in the polarity or changes in polarity of two driven wires. Certain embodiments, encode more than two bits in each transition of a three-wire, three-phase encoding system by allowing transition to any of the possible states from a current state. Given three rotational phases and two polarities for each phase, 6 states are defined, such that 5 states are available from any current state. Accordingly, there may be $\log_2(5) \cong 2.32$ bits per symbol (transition) and the mapper may accept a 16-bit word and convert it to 7 symbols.

In one example, an encoder may transmit symbols using 6 wires with two pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| | | | | |
|---|---|---|---|---|
| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include:

| | | | | | |
|---|---|---|---|---|---|
| + + − − | + − − + | + − + − | − + − + | − + + − | − − + + |

Accordingly, the total number of different states may be calculated as 15×6=90. To guarantee a transition between symbols, 89 states are available from any current state, and the number of bits that may be encoded in each symbol may be calculated as: $\log_2(89) \cong 6.47$ bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

The equation for the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The number of bits per symbol is:

$$\log_2\left(C(N_{wires}, N_{driven}) \cdot C\left(N_{driven}, \frac{N_{driven}}{2}\right) - 1\right).$$

Figure 5:
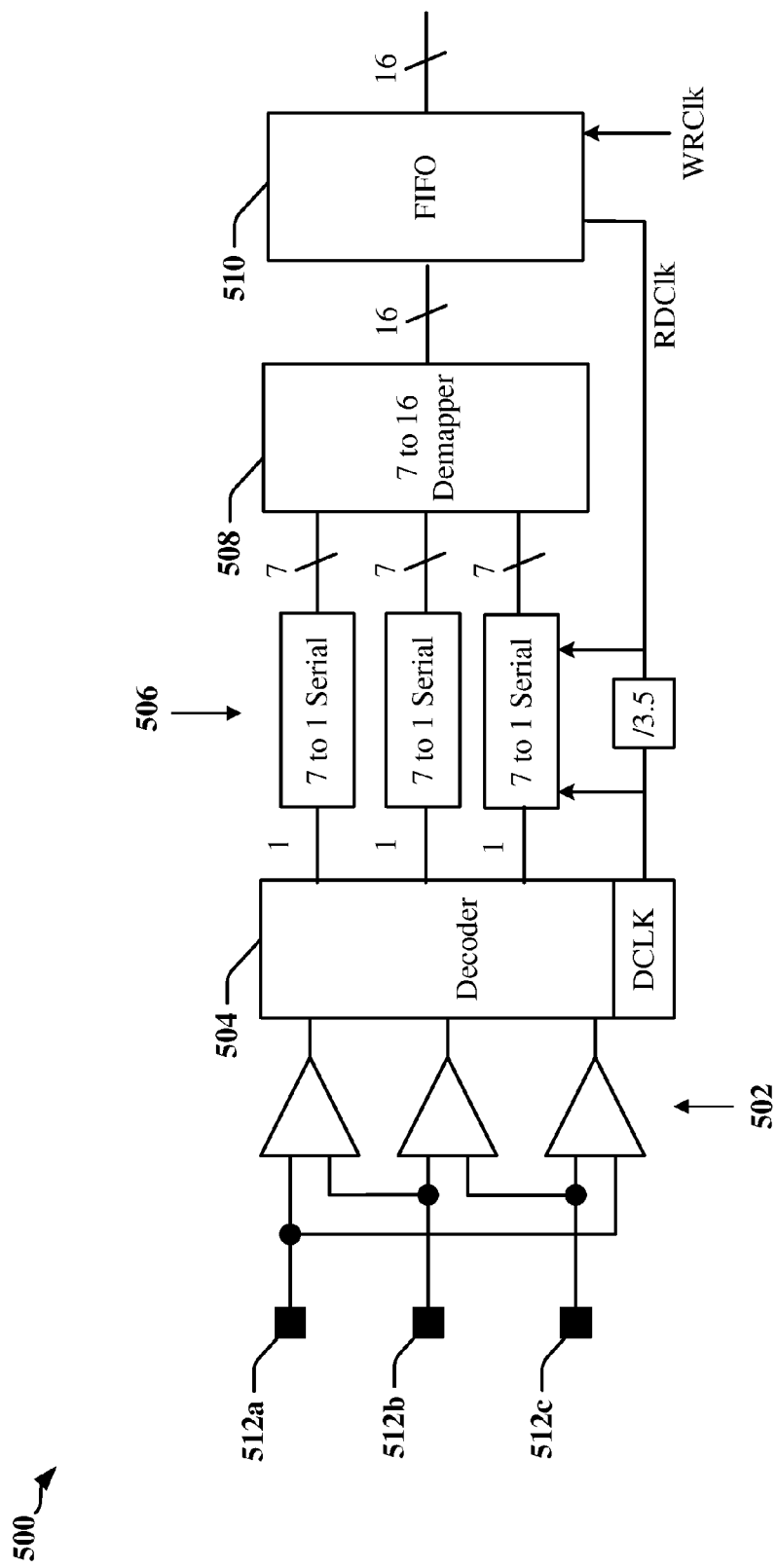
FIG. 5 illustrates an example of a receiver in a three-wire, three-phase interface (C-PHY).

FIG. 5 illustrates an example 500 of a receiver in a three-wire, three-phase PHY. The three-wire, three-phase example is illustrative of certain principles of operation applicable to other configurations of M-wire, N-phase receivers. Comparators 502 and decoder 504 are configured to provide a digital representation of the state of each of three transmission lines 512a, 512b and 512c, as well as the change in the state of the three transmission lines compared to the state transmitted in the previous symbol period. Seven consecutive states are assembled by serial-to-parallel convertors 506 to produce a set of 7 symbols to be processed by demapper 508 to obtain 16 bits of data that may be buffered in a first-in-first-out (FIFO) storage device 510, which may be implemented using registers, for example.

According to certain aspects disclosed herein, a plurality of three-state amplifiers can be controlled to produce a set of output states defined by a differential encoder, an N-phase polarity encoder, or another encoder that encodes information in wires or connectors that can assume one of the three states described.

With reference again to FIGS. 2 and 3, the communication link 220 may include a high-speed digital interface that can be configured to support both differential encoding scheme and N-phase polarity encoding. Physical layer drivers 210 and 240 may include N-phase polarity encoders and decoders, which can encode multiple bits per transition on the interface, and line drivers to drive signal wires 310a, 310b and 310c. The line drivers may be constructed with amplifiers that produce an active output that can have a positive or negative voltage, or a high impedance output whereby a signal wires 310a, 310b or 310c is in an undefined state or a state that is defined by external electrical components. Accordingly, the output drivers 308 may receive by a pair of signals 316 that includes data and output control (high-impedance mode control). In this regard, the three-state amplifiers used for N-phase polarity encoding and differential encoding can produce the same or similar three output states.

MIPI D-PHY Interface

According to certain aspects disclosed herein, systems and apparatus may employ some combination of differential and single-ended encoding for communicating between IC devices 202 and 230. In one example, the MIPI Alliance-defined "D-PHY" physical layer interface technology may be used to connect camera and display devices 230 to an application processor device 202. The D-PHY interface can switch between a differential (High Speed) mode and a single-ended (Low Power) mode in real time as needed to facilitate the transfer of large amounts of data or to conserve power and prolong battery life. The D-PHY interface is capable of operating in simplex or duplex configuration with single data lane or multiple data lanes with a unidirectional (Master to Slave) clock lane.

Figure 6:
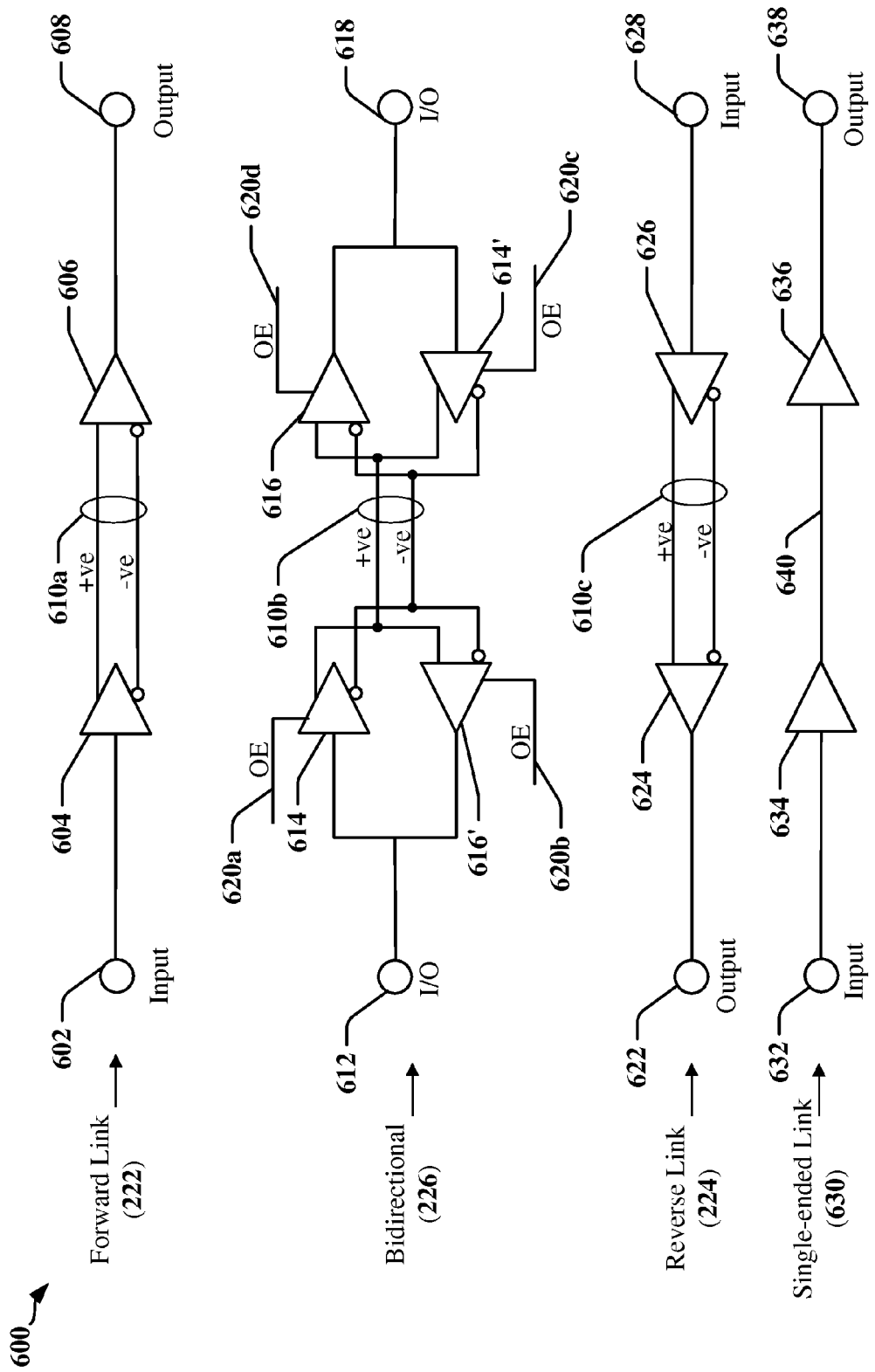
FIG. 6 illustrates an example differential signaling lanes that may be employed when a D-PHY interface is operated in high-speed mode.

FIG. 6 is a schematic diagram 600 illustrating differential signaling lanes that may be employed when a D-PHY implementation of the communication link 220 (see FIG. 2) is operated in High Speed mode. Differential signaling typically involves transmitting information electrically using two complementary signals sent on a pair of wires 610a, 610b or 610c, which may be referred to as a differential pair. The use of differential pairs can significantly reduce electromagnetic interference (EMI) by canceling the effect of common-mode interference that affects both wires in a differential pair. On the forward channel 222, a pair of wires 610a may be driven by a host differential driver 604. The differential driver 604 receives an input data stream 602 and generates positive and negative versions of the input 602, which are then provided to the pair of wires 610a. The differential receiver 606 on the client side generates an output data stream 608 by performing a comparison of the signals carried on the pair of wires 610a.

On the reverse channel 224, one or more pairs of wires 610c may be driven by a client-side differential driver 626. The differential driver 626 receives an input data stream 628 and generates positive and negative versions of the input 628, which are provided to the pair of wires 610c. The differential receiver 624 on the host generates an output data stream 622 by performing a comparison of the signals carried on the pair of wires 610c.

In a bidirectional channel 226, the host and client may be configured for half-duplex mode and may transmit and receive data on the same wire pair 610b. A bidirectional bus may alternatively or additionally be operated in full-duplex mode using combinations of the forward and reverse link drivers 604, 626 to drive multiple wire pairs 610a, 610c. In the half-duplex bidirectional implementation depicted for the bidirectional channel 226, the differential drivers 614 and 614' may be prevented from driving the wire pair 610b simultaneously using, for example, an output enable (OE) control 620a, 620c (respectively) to force the differential drivers 614 and 614' into a high impedance state. The differential receiver 616' may be prevented from driving the input/output 612 while the differential driver 614 is active, typically using an OE control 620b to force the differential receiver 616' into a high impedance state. The differential receiver 616 may be prevented from driving the input/output 618 while the differential driver 614' is active, typically using an OE control 620d to force the differential receiver 616 into a high impedance state. In some instances, the outputs of the differential drivers 614 and 614' and the differential receivers 616 and 616' may be in a high-impedance state when the interface is not active. Accordingly, the OE controls 620a, 620c, 620b and 620c of the differential drivers 614, 614', and the differential receivers 616 and 616' may be operated independently of one another.

Each of the differential drivers 604, 614, 614' and 626 may include a pair of amplifiers, one receiving at one input the inverse of the input of the other amplifier. The differential drivers 604, 614, 614' and 626 may each receive a single input and may have an internal inverter that generates an inverse input for use with a pair of amplifiers. The differential drivers 604, 614, 614' and 626 may also be constructed using two separately controlled amplifiers, such that their respective outputs can be placed in high impedance mode independently of one another.

When a D-PHY implementation of the communication link 220 (see FIG. 2) is operated in Low Power mode, signals may be transmitted on single wire data and/or clock lanes. In one example, the differential drivers 604, 614, and/or 626 may be reconfigured or controlled such that only one of the wires in a pair of wires 610a, 610b or 610c of an active lane is driven. In other examples, the differential drivers 604, 614, and/or 626 may be turned off or placed in a high-impedance output mode, and separate, single-ended line driver 634 and receiver 636 may be used for communications over a single-wire, single-ended link 640. In some instances, the input 632 and output 638 of the single-ended link 640 may be bidirectional, and both transmitting and receiving devices may employ a transceiver that includes both a line driver 634 and a receiver 636 that is controlled in accordance with one or more protocols.

Figure 7:
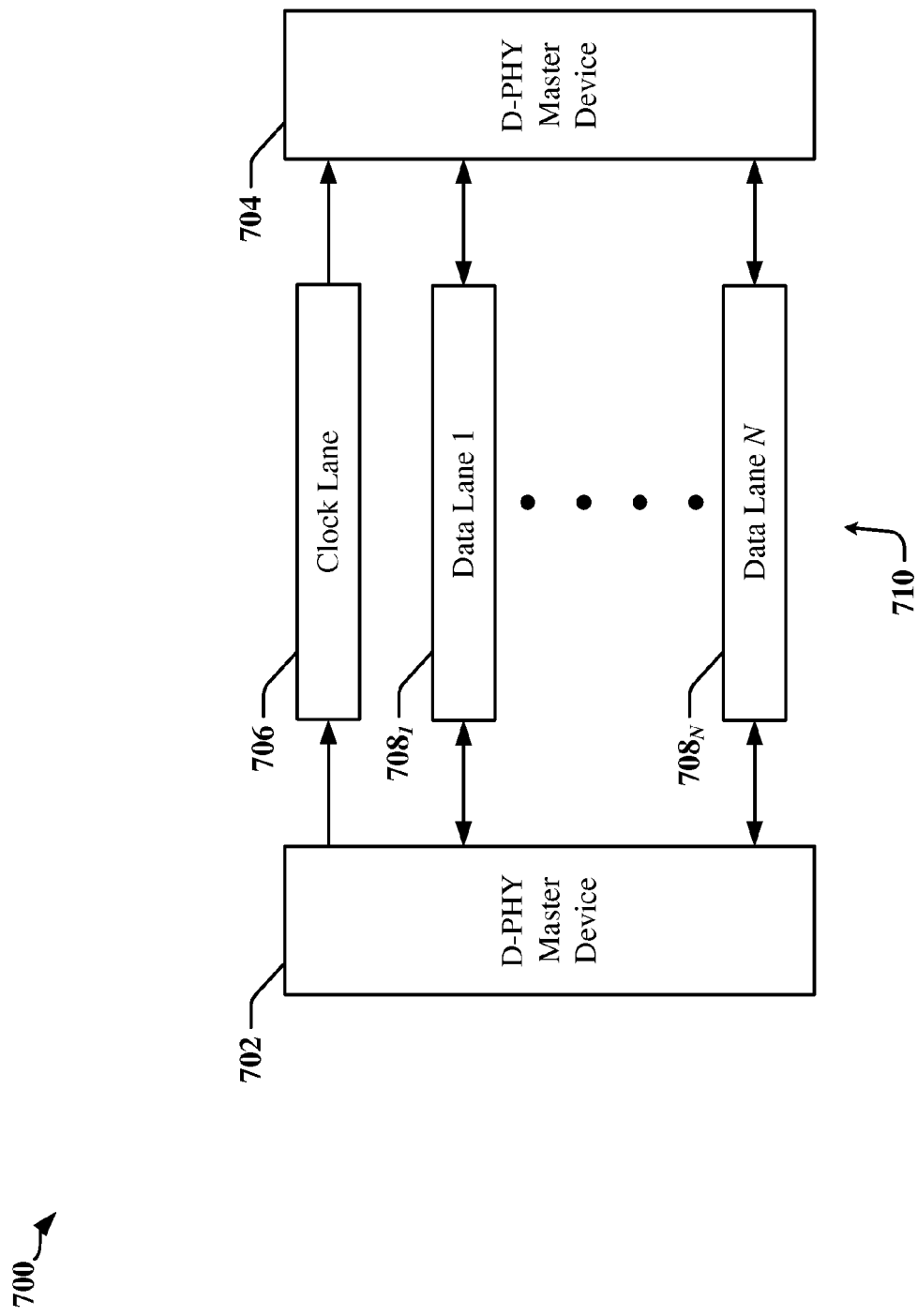
FIG. 7 illustrates a generalized example of a D-PHY configuration.

FIG. 7 illustrates a generalized D-PHY configuration 700 that includes a master device 702 and a slave device 704. The master device 702 generates clock signals that control transmissions on the wires 710. A clock signal is transmitted on a clock lane 706 and data is transmitted in one or more data lanes 7081-708N. The number of data lanes 7081-708N that are provided or active in a device may be dynamically configured based on application needs, volumes of data to be transferred and power conservation needs.

Figure 8:
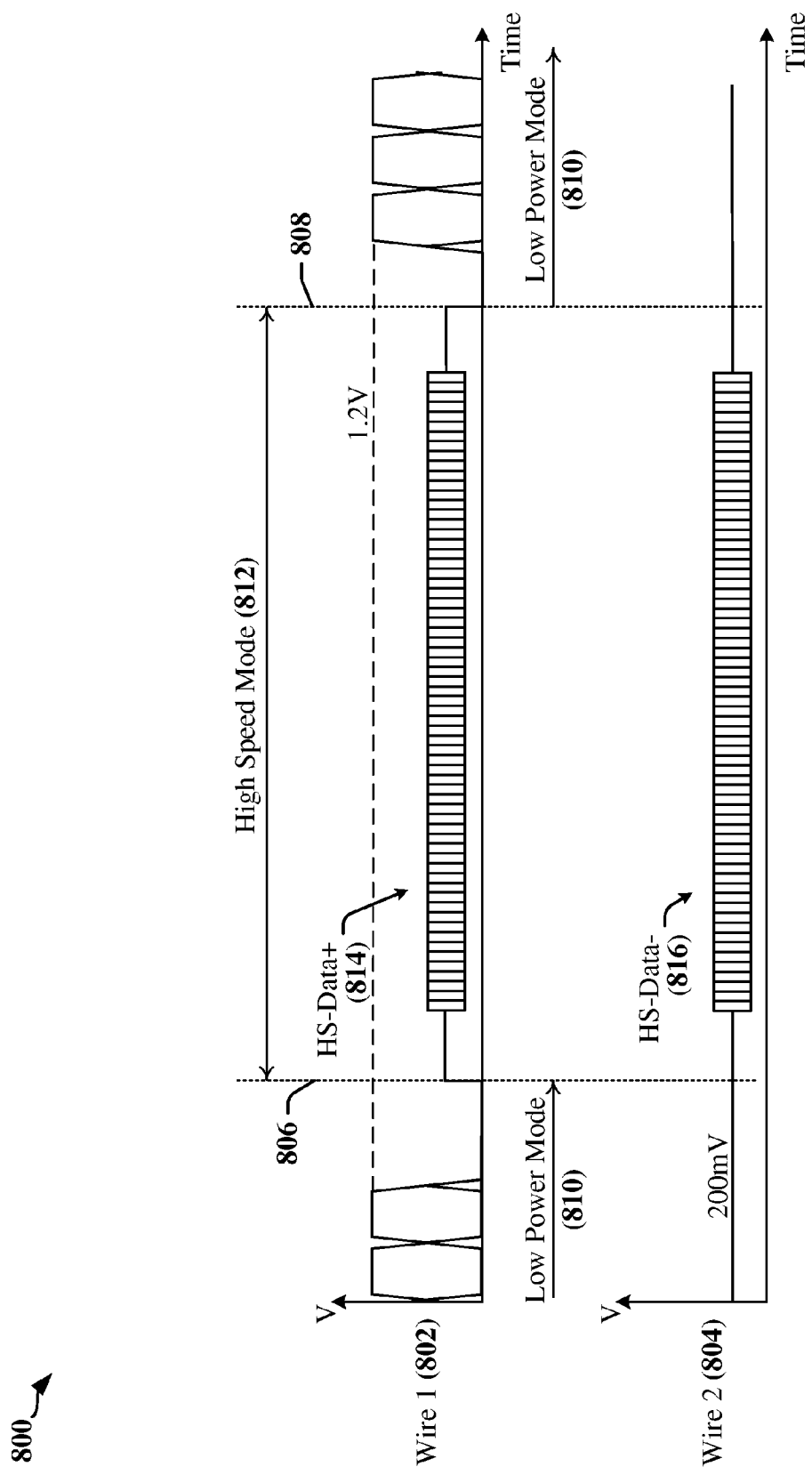
FIG. 8 illustrates waveforms in an example of a D-PHY interface.

FIG. 8 is a graphical representation 800 of waveforms in an example of a D-PHY interface. The example relates to two wires 802, 804 that may be configured to operate in a Low Power mode 810 and/or a High Speed mode 812. In the Low Power mode 810, a first wire carries data signals at a relatively low data rate and with a voltage level swing of approximately 1.2 volts. A second wire 804 may be idled or used for another purpose in the Low Power mode 810. In the High Speed mode 812, the first and second wires 802, 804 carry a low-voltage differential signal that may have a data rate that is orders of magnitude faster than the data rate of the Low Power mode 810. For example, the Low Power mode 810 may support data rates up to 10 megabits per second (Mbps) while the High Speed mode 812 may support data rates between 80 Mbps and 1 gigabit per second (Gbps). The positive version of the differential signal may be carried on the first wire 802, while the negative version is carried on the second wire 804, in the High Speed mode 812. The differential signal may have a relatively low amplitude voltage swing, which in one example may be approximately 200 millivolts (mV). 1
Extending the Signaling Range for C-PHY and D-PHY Interfaces The CSI and DSI interfaces currently limit the length of interconnects, based on limitations imposed by various electrical signaling characteristics and effects. In some instances, optical media is used to extend the range of the MIPI C-PHY or D-PHY physical layers. The use of optical media introduces certain additional complexities and issues when used with interfaces defined by the MIPI Alliance, particularly when multiple protocols are employed in a device connected using the MIPI-defined interfaces.

Figure 9:
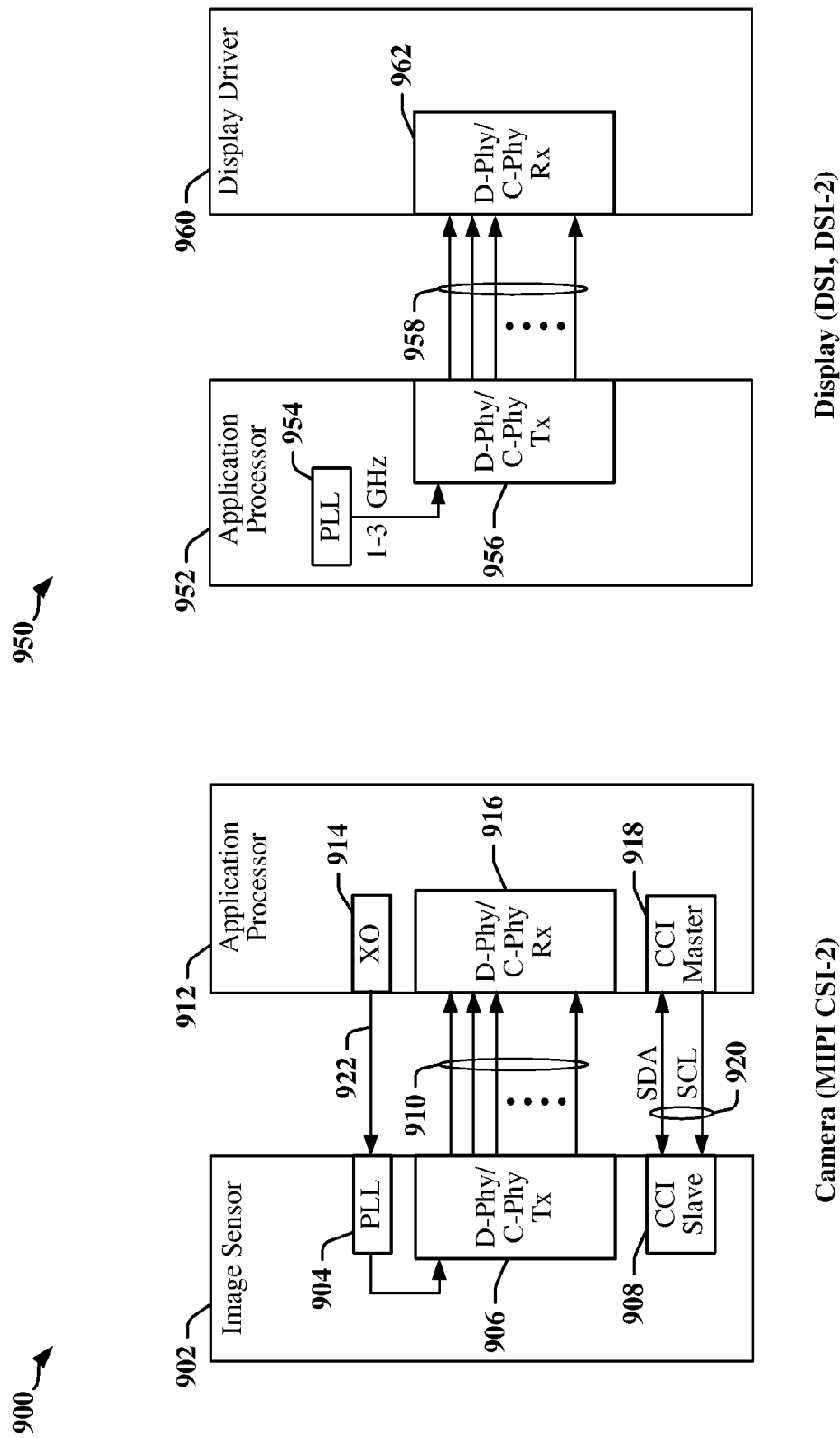
FIG. 9 illustrates certain interface configurations associated with a camera subsystem and a display subsystem that may be adapted according to certain aspects disclosed herein.

FIG. 9 illustrates certain interface configurations associated with a camera subsystem 900 and a display subsystem 950 that may be deployed within a mobile device, for example. The camera subsystem 900 may include a CSI-2 defined communication link between an image sensor 902 and an application processor 912. The communication link may include a high-data rate data transfer link 910 used by the image sensor 902 to transmit image data to the application processor 912 using a transmitter 906. The high-data rate data transfer link 910 may be configured and operated according to D-PHY or C-PHY protocols. The application processor 912 may include a crystal oscillator (XO) 914 or other clock source to generate a clock signal 922 that controls the operation of the transmitter 906. The clock signal 922 may be processed by a phase-locked loop (PLL) 904 in the image sensor 902. In some instances, the clock signal 922 may also be used by the D-PHY or C-PHY receiver 916 in the application processor 912. The communication link may include a Camera Control Interface (CCI), which is similar in nature to the Inter-Integrated Circuit (I2C) interface. The CCI bus may include Serial Clock (SCL) line that carries a clock signal and a Serial Data (SDA) line that carries data. The CCI link 920 may be bidirectional and may operate at a lower data rate than the high-data rate data transfer link 910. The CCI link 920 may be used by the application processor 912 to transmit control and data information to the image sensor 902 and to receive control and configuration information from the image sensor 902. The application processor 912 may include a CCI bus master 918 and the image sensor 902 may include a CCI slave 908.

The display subsystem 950 may include a unidirectional data link 958, which may be configured and operated according to D-PHY or C-PHY protocols. In the application processor 952, a clock source such as the PLL 954 may be used to generate a clock signal for controlling transmissions on the data link 958. At the display driver 960, a D-PHY or C-PHY receiver 962 may extract embedded clock information from sequences of symbols transmitted on the data link, or from a clock lane provided in the data link 958.

Devices adapted according to certain aspects disclosed herein may resolve issues arising from the complexities and hindrances associated with the use of optical media to extend the length of communication links that compliant or compatible with MIPI standards. Certain aspects disclosed herein relate to systems, apparatus and methods that support a broad range of interface protocols, and that can operate using different physical media. As shown in FIG. 9, for example, the camera subsystem 900 and/or display subsystem 950 may communicate high data rate information using D-PHY or C-PHY protocols and, in some configurations, may communicate using a reverse channel (e.g. the CCI link 920) for configuration of an image sensor 902 or other device. In some instances, a low power mode of operation may be defined for links that use either D-PHY or C-PHY protocols. Optical interfaces may be unsuited for low-power modes of operation, and the use of optical media to extend transmission distances can increase power consumption of a communications link. Optical interfaces are typically unidirectional. Although multiple channels may be multiplexed for transmission over the optical media in unidirectional transmissions, two optical links may be required to support bidirectional communication links.

Figure 10:
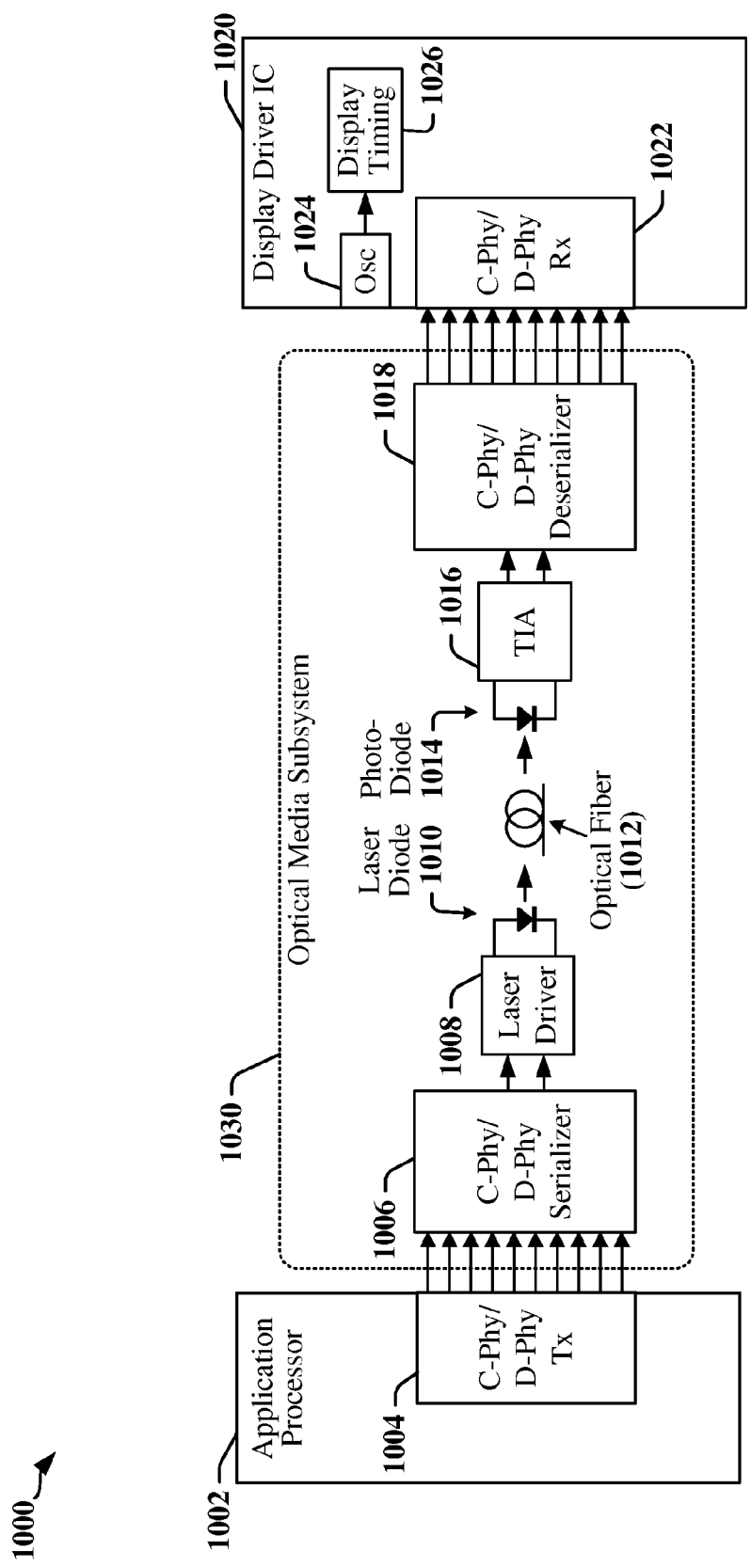
FIG. 10 illustrates a first example in which optical media may be used to extend a MIPI DSI connection.

FIG. 10 illustrates a first example 1000 in which optical media may be used to extend a MIPI DSI connection. An application processor 1002 may include a C-PHY and/or D-PHY encoder/transmitter component 1004 that provides transmission signals to a serializer 1006. The output of the serializer 1006 is provided to a laser driver 1008 that formats the serial C-PHY/D-PHY signals for driving a Laser diode 1010. Light signals produced by the Laser diode 1010 are carried through an optical fiber 1012 to a detector, such as a photodiode 1014. A transinductance amplifier (TIA) 1016 amplifies and conditions the signal produced by the photodiode 1014. A deserializer 1018 converts the amplified output if the TIA 1016 to parallel C-PHY or D-PHY formatted signals, which may be decoded by the C-PHY/D-PHY receiver/decoder 1022 at the display driver IC 1020 to obtain display information. The display driver IC 1020 extracts display data from the display information and uses the display data to provide a signal to a display. The signal provided to the display may be formatted according to one or more clock signals produced by display timing logic 1026, which may use a base clock generated by an oscillator and/or phase-locked loop, for example.

Display applications may be suited for communication link extension using an optical media subsystem 1030 in some implementations where data needs to flow in only one direction over the C-PHY or D-PHY interface signals. That is, the application processor 1002 may transmit display data and control information to the display driver IC 1020 while the display driver IC 1020 need not transmit any information to the application processor 1002. The optical media subsystem 1030 is less suited for applications employ more than one data link between devices and/or bidirectional data links. In many instances, however, the application processor 1002 may need to read registers in the display driver IC 1020, and bidirectional communication links are employed in such instances.

Figure 11:
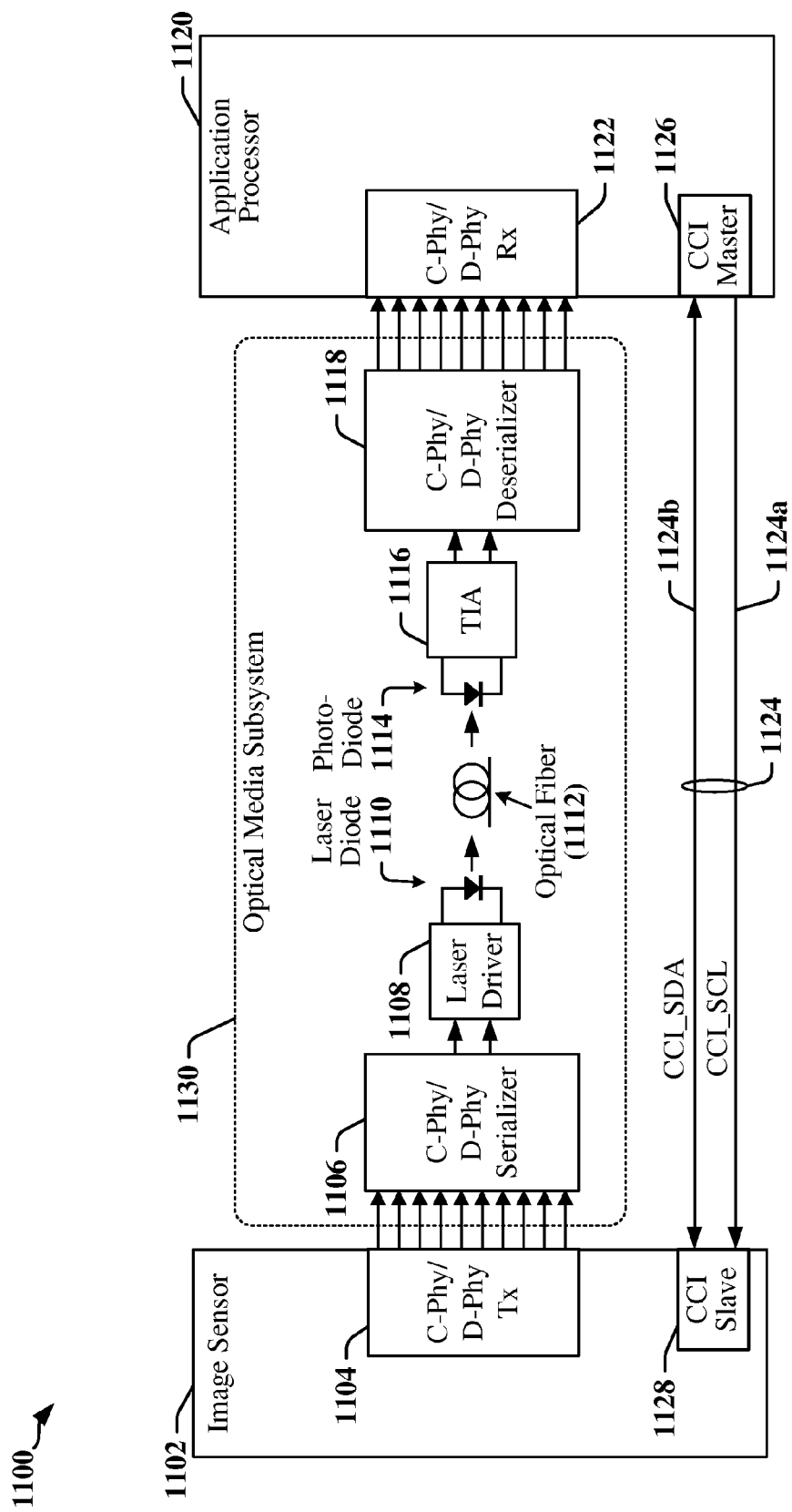
FIG. 11 illustrates an example of a bidirectional, multilink interface used to couple an image sensor to an application processor.

FIG. 11 is an example 1100 in which a bidirectional, multilink interface is used to couple an image sensor 1102 to an application processor 1120. An optical media subsystem 1130 may be used to extend the reach of a MIPI Camera Serial Interface (MIPI CSI-2). The image sensor 1102 may include a C-PHY or D-PHY encoder/transmitter component 1104 that provides transmission signals to a serializer 1106 of the optical media subsystem 1130. The output of the serializer 1106 is provided to a laser driver 1108 that formats the serial C-PHY/D-PHY signals for driving a Laser diode 1110. Light signals produced by the Laser diode 1110 are carried through an optical fiber 1112 to a detector, such as a photodiode 1114. A transinductance amplifier (TIA) 1116 may be used to amplify and otherwise condition the signal produced by the photodiode 1114. A deserializer 1118 converts the amplified output if the TIA 1116 to parallel C-PHY or D-PHY formatted signals from which a C-PHY or D-PHY receiver/decoder 1122 in the application processor 1120 may decode and/or extract data.

A CCI link 1124 provides a bidirectional channel for communicating lower speed control and configuration information. The application processor may include a CCI master device 1126, while the image sensor includes a CCI slave device 1128. The application processor transmits a clock signal over a first wire (SCL 1124*a*) of the CCI link 1124, and controls the direction of data flow over a second wire (SDA 1124*b*) of the CCI link 1124. The optical media subsystem 1130 is typically unidirectional and carries high-speed data from the image sensor 1102 to the application processor 1120. Accordingly the optical media subsystem 1130 may not be configured to relay the signals carried on the SCL 1124*a* or the SDA 1124*b* since both signals operate to carry data from the application processor 1120 to the image sensor 1102.

The example 1100 illustrated in FIG. 11 may be representative of many applications in which bidirectional communication links are used to exchange data between devices. Substantially greater bandwidths and/or bit rates may be provided for transmissions in one direction over the bidirectional communication link than in the reverse direction, and/or more than one type of physical link may be supported in one or both directions. In the example 1100 of FIG. 11, the higher-bandwidth data link may be employed to transfer video streams, frames, pixel or other image data from an image sensor to an application processor, while the lower-bandwidth data link may be employed for initialization, configuration, control and/or reading of registers in the image sensor. As illustrated, the lower-bandwidth data link may be implemented as a low-speed auxiliary interface according to CCI protocols, although other protocols including an I2C protocol may be used. When optical media is used to extend the reach of a bidirectional communication link, the optical media is typically deployed in the high-speed direction, while the bidirectional link may be maintained as a low-speed CCI, I2C or other low-speed link. The maximum extension for the bidirectional link may be dictated by the signaling characteristics of the low-speed direction (i.e., the non-optical path). The use of two optical paths may burden the designer with unacceptable power consumption, real estate and/or financial costs.

Including Optical Media in Bidirectional, Power-Sensitive Interfaces

Certain aspects disclosed herein may enable the use of optical data links in a wide range of applications that employ multiple, bidirectional, power-sensitive interfaces between devices within an apparatus. Certain C-PHY and D-PHY interfaces are defined to operate in two modes: sending data at high speed using low-voltage signaling; or sending data at a low speed with very low power consumption in a Low-Power (LP) Mode. DSI provides a LP mode in which the PHY operates at reduced power and low-power signals are transmitted in both directions over the C-PHY or D-PHY interface. For example, high-speed data may flow in only one direction, from an application processor to a display driver, while low-speed control information may flow in both directions. In LP mode high-speed drivers and receivers may be disabled, and standard digital CMOS logic levels are used for communication. The high-speed mode is unidirectional from the application processor to the display driver, while the LP mode is bi-directional so that the processor can read and write registers within the display driver. Since the optical link is unidirectional by its nature, bidirectional LP communication links may not be redirected over a single optical link.

Figure 12:
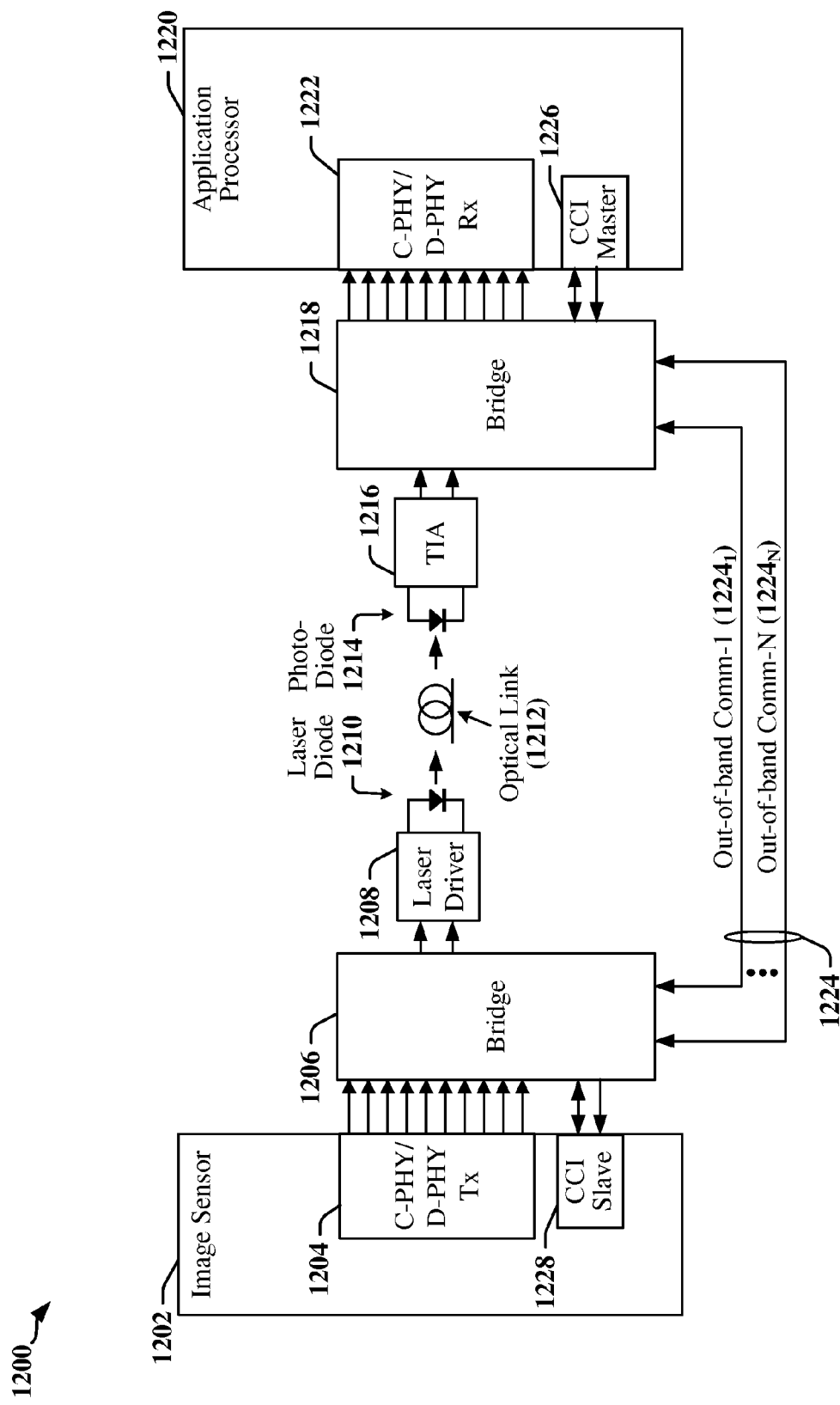
FIG. 12 illustrates a flexible optical interface according to certain aspects disclosed herein.

FIG. 12 is a block schematic diagram 1200 illustrating a flexible optical interface adapted in accordance with certain aspects disclosed herein. In the diagram 1200, certain aspects of the flexible optical interface are illustrated using the example of a camera interface that is used to couple an image sensor 1202 to an application processor 1220. In this example, high-speed and/or high-volume data is transmitted in one direction over an optical link 1212 from the image sensor 1202 to the application processor 1220. The optical link 1212 may be implemented using a suitable fiber optic medium. In another example, a display interface 950 (see FIG. 9) may be adapted to provide an optical interface that carries high-speed and/or high-volume data from the application processor 952 to the display driver 960. In the latter example and the example illustrated in FIG. 12, data is transmitted in one direction over the optical link 1212. It is contemplated that certain aspects disclosed herein may be employed to operate a bidirectional optical interface, or a reconfigurable interface deployed between any two IC devices and/or subsystems of an apparatus. It is further contemplated that certain aspects disclosed herein may be employed to manage communication between multiple data sources and data sinks one two or more IC devices, circuit boards or other devices. For example, an optical interface may be employed to facilitate communications between an application processor and a sub-system or circuit board that includes a display and an imaging sensor or camera.

The optical link 1212 may be selectively used to communicate data received in a format defined in accordance with a MIPI CSI-2 protocol. The image sensor 1102 may include a C-PHY/D-PHY encoder 1204 and CCI slave 1228 that provides a low-speed, bidirectional communications path. The C-PHY/D-PHY encoder 1204 and the CCI slave 1228 are coupled to a first bridge 1206 that includes a serializer that, in a high-speed mode of operation, may be configured to provide a serial data signal to the Laser driver 1208. The Laser driver 1208 may format the serial data signal for driving a Laser diode 1210. Light signals produced by the Laser diode 1210 are carried through the optical link 1212 to a detector, such as a photodiode 1214. A TIA 1216 may be used to amplify and otherwise condition the signal produced by the photodiode 1214. A deserializer in a second bridge 1218 converts the amplified output if the TIA 1216 to parallel C-PHY or D-PHY formatted signals from which a C-PHY or D-PHY receiver/decoder 1222 in the application processor 1220 may decode and/or extract data.

The first bridge 1206 and the second bridge 1218 may operate to select a path for both high-speed unidirectional data and low-speed, low-power, and/or bidirectional signals. In one example, the first bridge 1206 and the second bridge 1218 may disable optical circuits in a low-power mode of operation, and may redirect the high-speed data over a non-optical communication link (auxiliary bus 1224), which may include electrically conductive wires or traces. In another example, the first bridge 1206 and the second bridge 1218 may pass-through CCI, I2C or other low data rate signals to two or more wires $1224_1$-$1224_N$ of the auxiliary bus 1224 suitable for handling the low data rate traffic. In another example, the first bridge 1206 and the second bridge 1218 may convert CCI, I2C or other low data rate signals for transmission using a protocol and a number of wires $1224_1$-$1224_N$ of the auxiliary bus 1224 that can handle the CCI/I2C data rate data over an extended distance.

The bridging function provided by the first bridge 1206 and the second bridge 1218 may be controlled by processors configured to recognize when the PHY is sending data in LP mode. The first bridge 1206 and the second bridge 1218 may exchange messages over any available link to configure a mode of operation. The bridging function may be configured to separate LP mode data from high-speed data (i.e., the primary data stream). The separated LP mode data may be transmitted over the auxiliary bus 1224, which may operate as an out-of-band communication link. That is, the auxiliary bus 1224 may employ a different proprietary or standards-defined protocol that the protocols used to encode data provided to the first bridge 1206 and/or the second bridge 1218. The first bridge 1206 and the second bridge 1218 may also communicate data in accordance with C-PHY or D-PHY protocols. For example, in a low-power mode of operation, the first bridge 1206 may be configured to implement the LP mode protocol of C-PHY or D-PHY such that LP communications can be bridged to connectors of the auxiliary bus 1224. In the latter example, the second bridge 1218 may be configured to merge data received from the auxiliary bus 1224 back onto the C-PHY or D-PHY interface.

According to certain aspects, the first bridge 1206 and the second bridge 1218 may be configured to support LP mode data in one or both directions. For example, MIPI CSI-2 and MIPI DSI or DSI-2 specifications define a wired interface between a camera and application processor, or between the application processor and a display. The low level PHY interface in each of these applications can be MIPI C-PHY or MIPI D-PHY. The C-PHY and D-PHY interfaces are defined to operate in two modes, to send data at high speed using low-voltage signaling, or to send data at a low speed and consume a very small amount of power using LP Mode. In LP mode the high-speed drivers and receivers are disabled, and standard digital CMOS logic levels may be used for communication. The high-speed mode is unidirectional from the Application Processor to the Display, but the LP mode is bi-directional so that the processor can read and write registers within the display. An LP mode protocol function in the first bridge 1206 and the second bridge 1218 may include support for bus turn-around (BTA).

Figure 13:
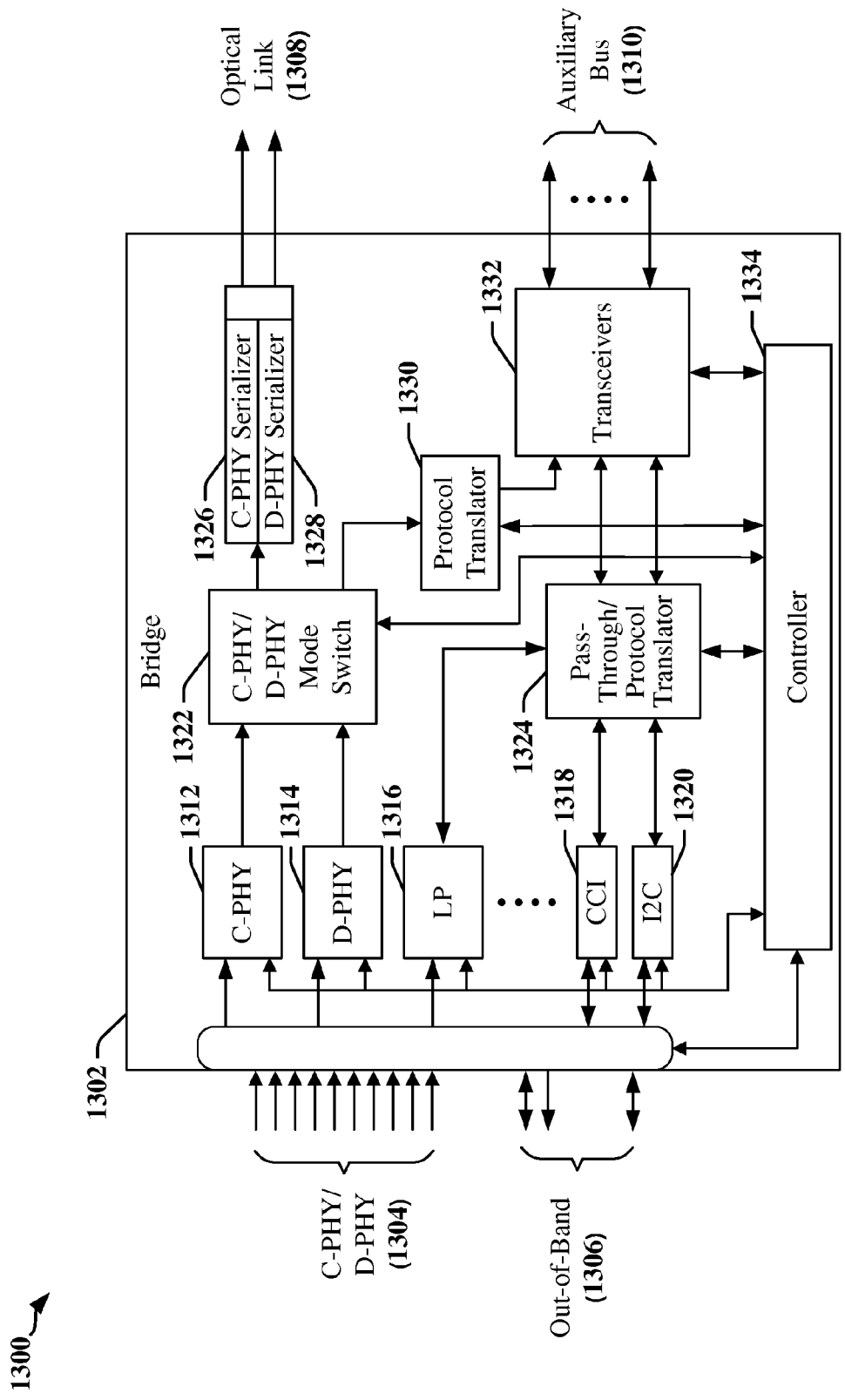
FIG. 13 illustrates an example of a transmitting bridge circuit according to certain aspects disclosed herein.

FIG. 13 is a simplified block diagram 1300 illustrating certain aspects of a transmitting bridge circuit 1302 according to certain aspects disclosed herein. The transmitting bridge circuit 1302 may include or be coupled to a Laser driver 1208, for example. The illustrated transmitting bridge circuit 1302 may correspond to the first bridge 1206 of FIG. 12, for example. The transmitting bridge circuit 1302 may include other components such as a TIA, serializers, deserializers, framers, deframers and the like (not shown) that permit the transmitting bridge circuit 1302 to be configured for use as the second bridge 1218 of FIG. 12. Various configurations of the transmitting bridge circuit 1302 are illustrated in FIGS. 16-20.

The transmitting bridge circuit 1302 may include or cooperate with a controller 1334, which may be implemented in a processing circuit that configures, monitors, operates and otherwise controls various aspects of the transmitting bridge circuit 1302 and its subcomponents. The subcomponents of the transmitting bridge circuit 1302 may include switching logic, multiplexers, de-multiplexers, drivers, receivers, clock recovery circuits, and so on. Certain subcomponents of the transmitting bridge circuit 1302 may be implemented in some combination of hardware and software elements.

The transmitting bridge circuit 1302 may include interface circuits 1312, 1314, 1316, 1318, 1320 that configured to receive, relay, and/or process signals provided in accordance with one or more protocols and/or interface signaling specifications. For example, the transmitting bridge circuit 1302 may include a C-PHY interface 1312, and/or a D-PHY interface that extract a clock signal and process C-PHY/D-PHY signals 1304 in accordance with the clock signal. The transmitting bridge circuit 1302 may also include a C-PHY/D-PHY low-power interface 1316 that can handle signaling transmitted by a MIPI-compliant device (here an image sensor) in low-power mode. The transmitting bridge circuit 1302 may also include a CCI interface 1318, an I2C interface 1320, or other interface configured to transmit and receive signals through an out-of-band channel 1306. In one example, the CCI interface 1318 may include line drivers and receivers that operate to receive and condition signals transmitted in accordance with CCI protocols.

The controller 1334 of the transmitting bridge circuit 1302 may be configured to determine a mode of operation associated with the C-PHY/D-PHY signals 1304 and/or the signals carried by the out-of-band channel 1306. In one example, the interface circuits 1312, 1314, 1316, 1318, 1320 may identify the protocol associated with the C-PHY/D-PHY signals 1304, and may further indicate other information such as clock rates, number of lanes used, and directionality of lanes and/or signal lines. A next level of logic 1322, 1324 may be configured to determine a mode of operation for one or more communication links controlled by the transmitting bridge circuit 1302, and may be further configured to select a mode of processing for the C-PHY/D-PHY signals 1304 and/or the signals carried by the out-of-band channel 1306. In a first mode of operation, the one or more communication links may be operated in a high data rate mode, and the PHY/D-PHY signals 1304 may be provided to an appropriately configured serializer 1326, 1328 to provide a serialized data signal for transmission over an optical link 1308. In the first mode, the signals carried by the out-of-band channel 1306 may be coupled to electrically conductive wires, traces, conductors, or connectors of an auxiliary bus 1310. The signals carried by the out-of-band channel 1306 may be translated to a different protocol and/or signaling standard to obtain a greater transmission distance for the signals carried by the out-of-band channel 1306. For example, signaling associated with a CCI interface may be transmitted using a lower clock rate, or using differential transmitters and receivers to obtain better signaling characteristics. In one example, the CCI signals may be split and transmitted over two lanes, each of the two lanes operating at a lower clock rate than the clock provided in the original CCI signaling.

In a second mode of operation, the one or more communication links may be operated in a "forced" low-power mode, in which the optical link is disabled and high data rate C-PHY/D-PHY signals 1304 may be provided to a protocol translator 1330 for conversion to a signaling format suitable for communications over the auxiliary bus 1310. The second mode may be initiated independently of the C-PHY or D-PHY channel. In the second mode, the transmitting bridge circuit 1302 or a processing circuit associated with the transmitting bridge circuit 1302 may determine a configuration for the auxiliary bus 1310 based on the data rate of the C-PHY/D-PHY signals 1304, the number of connectors available in the auxiliary bus 1310, the distance traversed by the connectors, and other signaling characteristics associated with the auxiliary bus 1310. The protocol translator 1330 and the transceivers 1332 may then be configured to transmit data consistent with the selected configuration. In one example, data may be spread over multiple lower rate D-PHY or C-PHY interfaces. In another example, data may be transmitted over multiple lanes encoded using a multi-level pulse amplitude modulation scheme. In the second mode, the signals carried by the out-of-band channel 1306 may be translated to a different protocol and/or signaling standard to obtain a greater transmission distance for the signals carried by the out-of-band channel 1306. For example, signaling associated with a CCI interface may be transmitted using a lower clock rate, or using differential transmitters and receivers to obtain better signaling characteristics. In one example, the CCI signals may be split and transmitted over two lanes, each of the two lanes operating at a lower clock rate than the clock provided in the original CCI signaling.

In a third mode of operation, the C-PHY/D-PHY signals 1304 may be encoded in a MIPI-defined low-power mode. The C-PHY/D-PHY signals 1304 may be passed through the transmitting bridge circuit 1302, with the auxiliary bus 1310 configured for low power mode signaling in accordance with the corresponding standard. In some instances, a reconfiguration of the auxiliary bus 1310 may be indicated. For example, the length of one or more connectors in the auxiliary bus 1310 may exceed a maximum distance for reliable communications, and the auxiliary bus 1310 may be reconfigured to spread data to be transferred across multiple lanes or interfaces operated at lower data rates, where the combined data rate is sufficient to support the throughput specified by the appropriate standards or specifications. In the third mode, the signals provided to the out-of-band channel 1306 may be translated to a different protocol and/or signaling standard to obtain a greater transmission distance for the signals provided to the out-of-band channel 1306. For example, signaling associated with a CCI interface may be transmitted using a lower clock rate, or using differential transmitters and receivers to obtain better signaling characteristics. In one example, the CCI signals may be split and transmitted over two lanes, each of the two lanes operating at a lower clock rate than the clock provided in the original CCI signaling.

In some instances, protocol translation includes modifying an encoding scheme and/or modifying a signaling scheme. The protocol translation may include splitting or combining data using multiplexers and/or demultiplexers, transcoding data for transmission.

Figure 14:
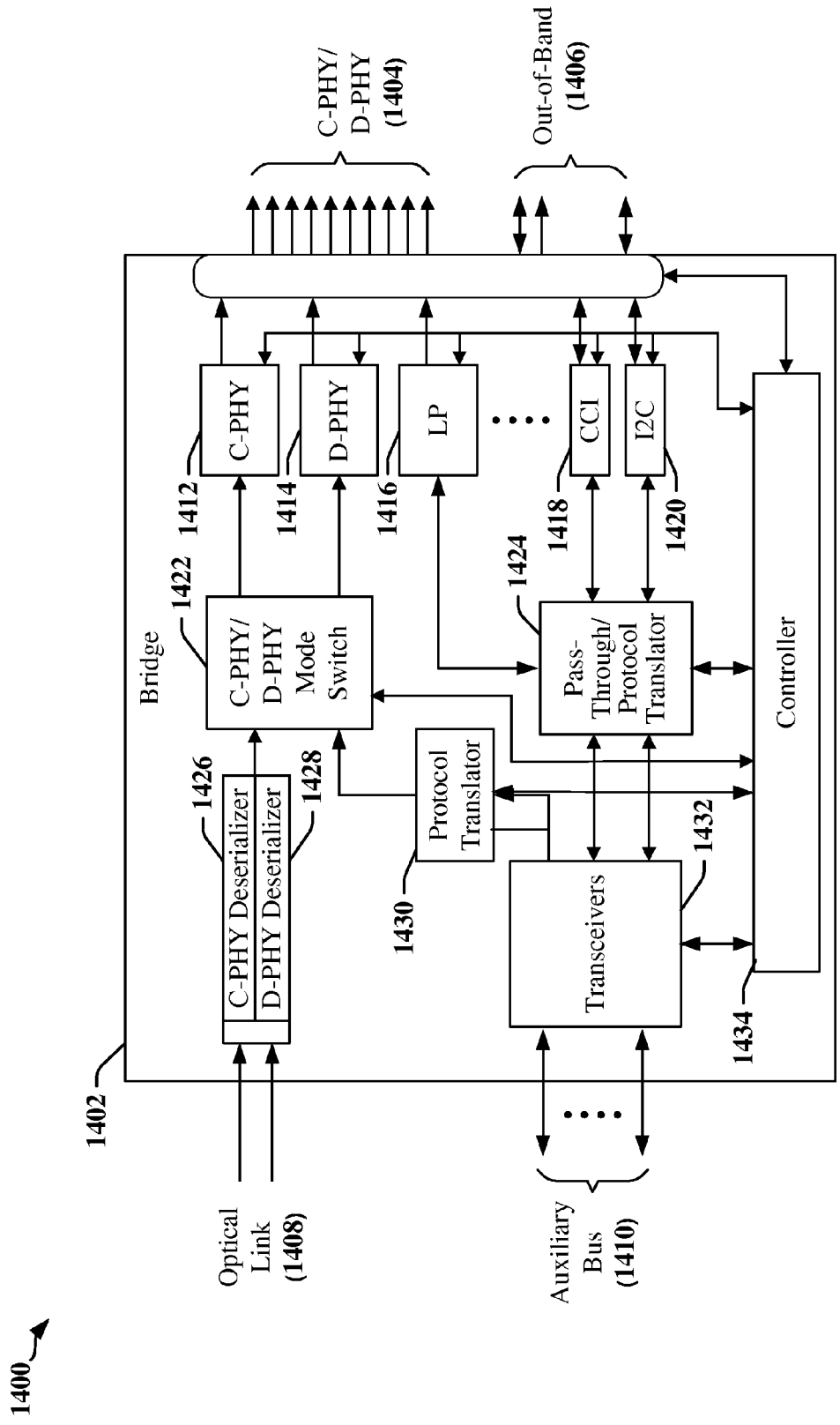
FIG. 14 illustrates an example of a receiving bridge circuit according to certain aspects disclosed herein.

FIG. 14 is a simplified block diagram 1400 illustrating certain aspects of a receiving bridge circuit 1402 according to certain aspects disclosed herein. The receiving bridge circuit 1402 may include or be coupled to an optical receiver, which may include a photodiode 1214 and TIA 1216, for example. The receiving bridge circuit 1402 may correspond to the second bridge 1218 illustrated in FIG. 12. The receiving bridge circuit 1402 may include other components such as a Laser driver 1208 and Laser diode 1210, serializers, deserializers, framers, deframers and the like (not shown) that permit the receiving bridge circuit 1402 to be configured for use as the first bridge 1206 of FIG. 12. Various configurations of the receiving bridge circuit 1402 are illustrated in FIGS. 16-20.

The receiving bridge circuit 1402 may include or cooperate with a controller 1434 that may be implemented in a processing circuit that configures, monitors, operates and otherwise controls various aspects of the receiving bridge circuit 1402 and its subcomponents. The subcomponents of the receiving bridge circuit 1402 may include switching logic, multiplexers, de-multiplexers, drivers, receivers, clock recovery circuits, and so on. Certain subcomponents of the receiving bridge circuit 1402 may be implemented in some combination of hardware and software elements.

The receiving bridge circuit 1402 may include interface circuits 1412, 1414, 1416, 1418, 1420 that provide to drive high speed data signals and other data unidirectional and bidirectional data signals to PHY of a receiving device. These signals are provided in accordance with one or more protocols and/or interface signaling specifications. For example, the receiving bridge circuit 1402 may include a C-PHY interface 1412, and/or a D-PHY interface provide C-PHY/D-PHY signals 1404 in accordance with the clock signal. The receiving bridge circuit 1402 may also include a C-PHY/D-PHY low-power interface 1416 that can handle signaling transmitted by a MIPI-compliant device in low-power mode. The receiving bridge circuit 1402 may also include a CCI interface 1418, an I2C interface 1420, or other interface configured to transmit and receive signals from an out-of band channel 1406. In one example, the CCI interface 1418 may include line drivers and receivers that operate to receive and condition signals transmitted in accordance with CCI protocols.

The receiving bridge circuit 1402 may be configured to determine a mode of operation associated with the C-PHY/D-PHY signals 1404 and/or the signals received from the out-of band channel 1406. The mode of operation may be determined by configuration and/or through communication with a transmitting bridge circuit 1302 at the transmitting end of an optical link 1408, 1308.

Figure 15:
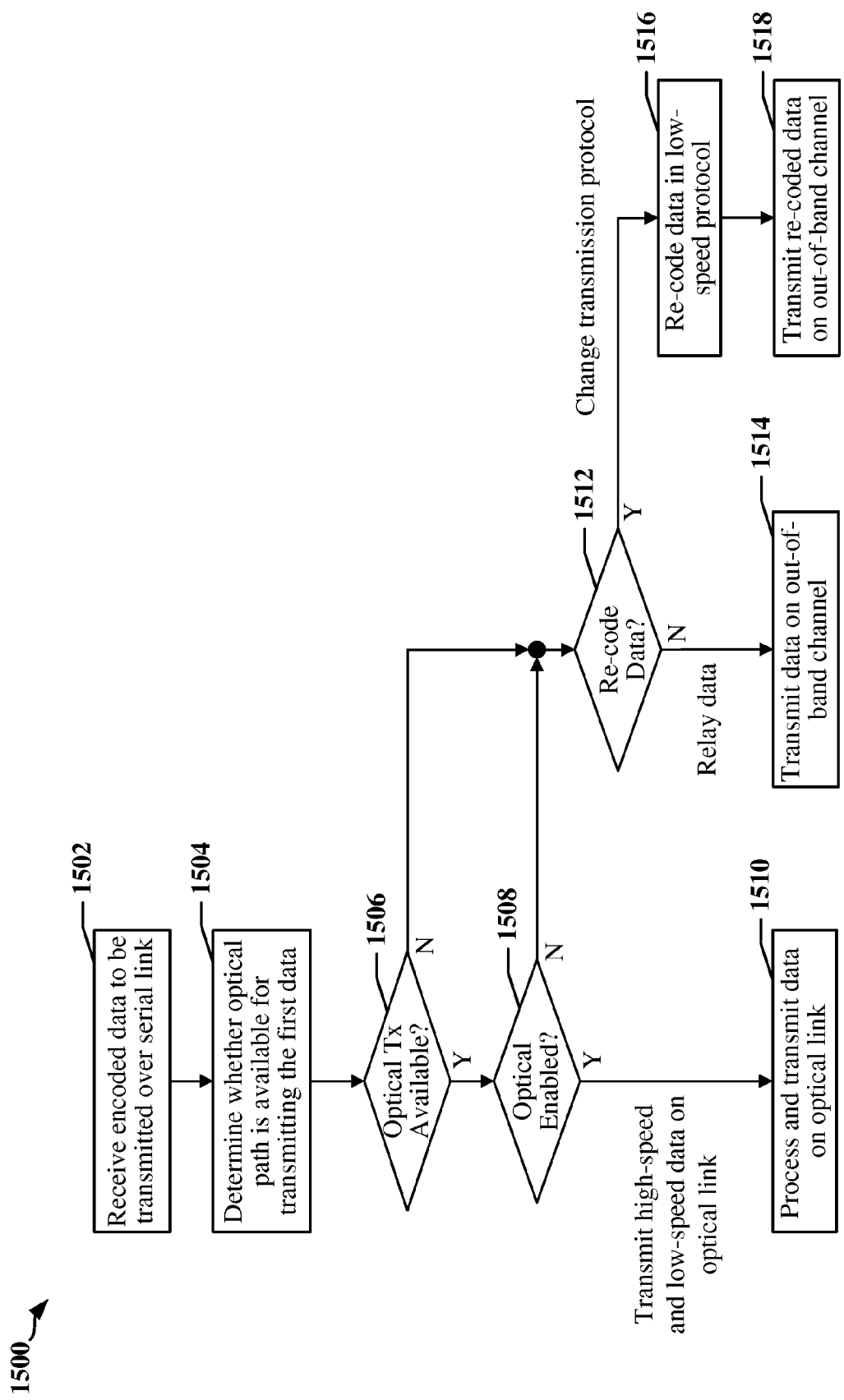
FIG. 15 is a diagram illustrating a method for configuring a flexible optical interface in accordance with certain aspects disclosed herein.

FIG. 15 is a flowchart 1500 illustrating an example of a method for dynamically configuring a flexible optical interface in accordance with certain aspects disclosed herein. The method may be performed by a processing circuit such as the bridge circuit 1302 of FIG. 13, the bridge circuit 1402 of FIG. 14 or another processing circuit that manages, configures or controls a bridge circuit 1302, 1402. In the example illustrated by FIG. 15, data for transmission over a data communication link may be received at block 1502. The data may be formatted for transmission in accordance with one or more predefined communications protocols, such as a C-PHY protocol, a D-PHY protocol, an I2C protocol, and/or a CCI protocol. Multiple data sources may provide data for transmission over the data communication link. In one example, an apparatus may have one or more application processors that communicate with an image sensor and a display driver. In another example, an application processor may use a C-PHY interface to communicate high-speed data, and a CCI interface to communicate low-speed data. In at least some instances, data received from different sources may be encoded according to different protocols, which may include protocols defined by a standards body such as the MIPI alliance and/or proprietary protocols.

At block 1504, the bridge circuit 1302, 1402 may determine whether an optical path is available for communicating between devices. The determination of whether an optical path is available may include detecting presence of optical circuitry, identifying whether optical circuitry can be used or configured for transmission of the data in a desired direction, and determining whether the optical circuitry is being used by another application in a manner that precludes its use for transmitting the data. In one example, an optical link 1308, 1408 used to carry high-speed data provided by an image sensor 1202 to an application processor 1220 may be incapable of carrying CCI control data in the opposite direction (i.e., to the image sensor 1202).

In some examples, the presence of optical circuitry may be detected and its capabilities and configurability identified from configuration parameters maintained by the bridge circuit 1302, 1402, the application processor 1220, and/or another processing circuit or device. Information identifying a current mode of operation of the optical link 1308, 1408 may also be maintained by the bridge circuit 1302, 1402 or accessed through the application processor 1220. If optical circuitry is determined to be unavailable, then the bridge circuit 1302, 1402 may determine at block 1506 that the data should be communicated using an out-of-band channel 1306, 1406, and the process then continues at block 1512.

When the bridge circuit 1302, 1402 determines at block 1506 that the data can be communicated using an optical link 1308, 1408 based on capabilities of the optical link 1308, 1408, then the bridge circuit 1302, 1402 may determine at block 1508 whether the optical link 1308, 1408 has been enabled. In some instances, the optical link 1308, 1408 may be unconditionally disabled to conserve power when a device management function determines that battery life requires a reduction in power consumption. In other instances, the optical link 1308, 1408 may be disabled for certain traffic but available for other traffic. For example, certain data types may be subject to quality of service requirements that necessitate transmission at high data rates, while other types of data may be characterized by a low data-rate or may be low priority, high data-rate traffic that is tolerant of delay and can be redirected to an out-of-band channel 1306, 1406. In some instances, the optical link 1308, 1408 may be usable under power-restricted modes of operation when a volume of data to be transmitted exceeds certain thresholds. In other instances, data packets may be dropped during power-restricted modes of operation. When the bridge circuit 1302, 1402 determines at block 1508 that the optical link 1308, 1408 is disabled for the type of data to be transmitted, then the process continues at block 1512. Otherwise, the bridge circuit 1302, 1402 may process the data for optical communication and transmit the process data on the optical link 1308, 1408 in block 1510.

At block 1512, the data is to be transmitted over an out-of-band channel 1306, 1406, and the bridge circuit 1302, 1402 may determine whether the data should be re-coded in a different protocol. The determination may include identifying whether the data is high-speed data or low-speed data. For example, the data may be designated as high-speed data when it is provided from a high-speed interface. In another example, the data may be designated as high-speed data when it arrives at a rate that potentially exceeds the capacity of the out-of-band channel 1306, 1406. Other characteristics of the data, its rate of arrival, and the capacity of the out-of-band channel 1306, 1406 may be taken into consideration in order to determine whether data should be re-coded. In some instances, certain types of low-speed data may be transmitted at block 1514 without significant alteration of format or protocol. For example, CCI data may be transmitted without modification when two or more wires of the out-of-band channel 1306, 1406 are configured as a CCI bus.

If, at block 1512, the bridge circuit 1302, 1402 may have determined that the data is to be re-coded, the bridge circuit 1302, 1402 may cause the data to be translated into a different format and/or protocol at block 1516 before transmission on the out-of-band channel 1306, 1406 at block 1518. Certain types of low-speed data, including CCI and I2C data may be re-coded when the initial protocol associated with such low-speed data cannot be accommodated as presented by the out-of-band channel 1306, 1406, or is incompatible with signaling used on the out-of-band channel 1306, 1406. Certain types of high-speed data may be re-coded at block 1516. In one example, the bridge circuit 1302, 1402 may transmit full-rate C-PHY data as quarter-rate C-PHY data, where both full-rate and quarter-rate C-PHY transmission modes are defined by MIPI standards. In some instances, the bridge circuit 1302, 1402 may provide configuration information to sources of high-speed data that causes the sources to reduce the data rate of the high-speed data. In the C-PHY data example, the data source may provide quarter-rate C-PHY data when the bridge circuit 1302 identifies the optical link 1306, 1406 as unavailable. In another example, the bridge circuit 1302, 1402 may convert certain types of data for transmission over one or more pairs of wires of the out-of-band channel 1306, 1406 that are configured for CCI operation. In another example, the bridge circuit 1302, 1402 may convert certain high-speed data to a format that may be transmitted over an increased number of wires of the out-of-band channel 1306, 1406.

In some instances, the bridge circuit 1302, 1402 may segment, packetize, or otherwise divide and buffer high-speed data at block 1516 in order to match data rates of the high-speed data with transmission capacity of the out-of-band channel 1306, 1406. In some instances, the bridge circuit 1302, 1402 may cooperate with, and/or provide signaling to data sources in order to manage and control rates of flow of data over the out-of-band channel 1306, 1406. The bridge circuit 1302, 1402 may communicate with device management functions that control activation of the optical link 1308, 1408 in order to identify chokepoints and/or reliability issues that may arise from the unavailability of the optical link 1308, 1408.

Example Configurations of an Optical Interface

Figure 16:
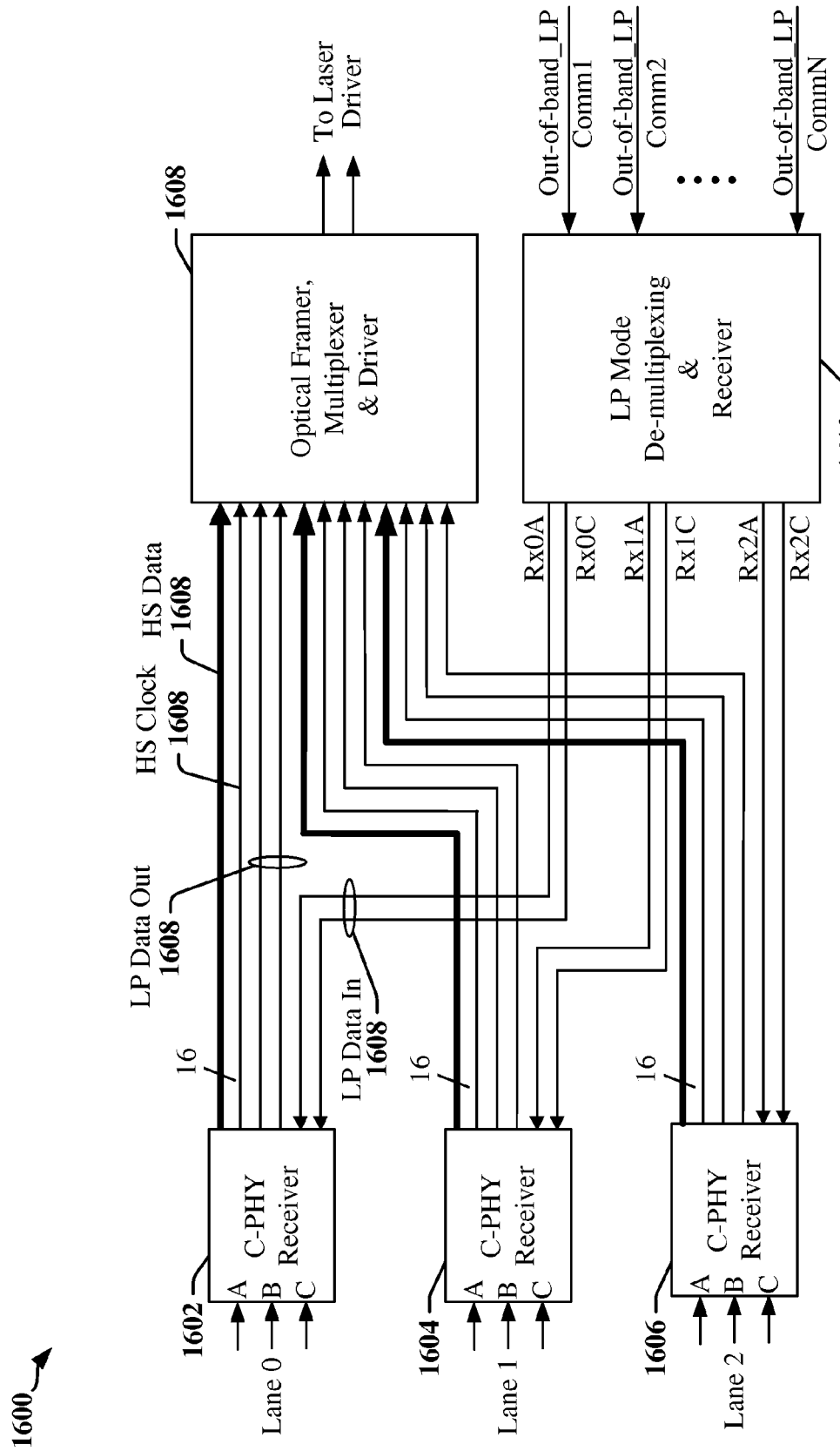
FIG. 16 is a block schematic diagram illustrating a first example of a bridge configuration provided in accordance with certain aspects disclosed herein.

FIG. 16 is a block schematic diagram illustrating a first example of a bridge configuration 1600 provided in accordance with certain aspects disclosed herein. In this configuration 1600, the bridge is configured as a C-PHY serializer with unidirectional, out-of-band signaling. The diagram illustrates the connections between C-PHY receivers 1602, 1604, 1606 and an optical framer, multiplexer and driver 1608, which controls the data signal provided to the Laser driver, and between the C-PHY receivers 1602, 1604, 1606 and the low-power interface 1610. The low-power interface 1610 may be configured according to CCI protocols, or another protocol suitable for handling the characteristics of the electrically conductive bus, including the physical length of the bus.

In this configuration 1600, forward LP mode data is sent over the optical link, and the reverse LP mode data is sent over the out-of-band auxiliary bus. The C-PHY receivers 1602, 1604, 1606 may include high-speed receivers for C-PHY data, as well as LP mode receivers and LP mode drivers. In this configuration 1600, the LP mode receivers may transmit high-speed data and LP data through the optical media, using the optical framer, multiplexer and driver 1608 to multiplex the LP mode data onto the optical fiber link. The LP reverse link is received from out-of-band signals and combined in the C-PHY Receivers when the C-PHY link is operating in a mode where LP mode data is transferred in the reverse direction.

Figure 17:
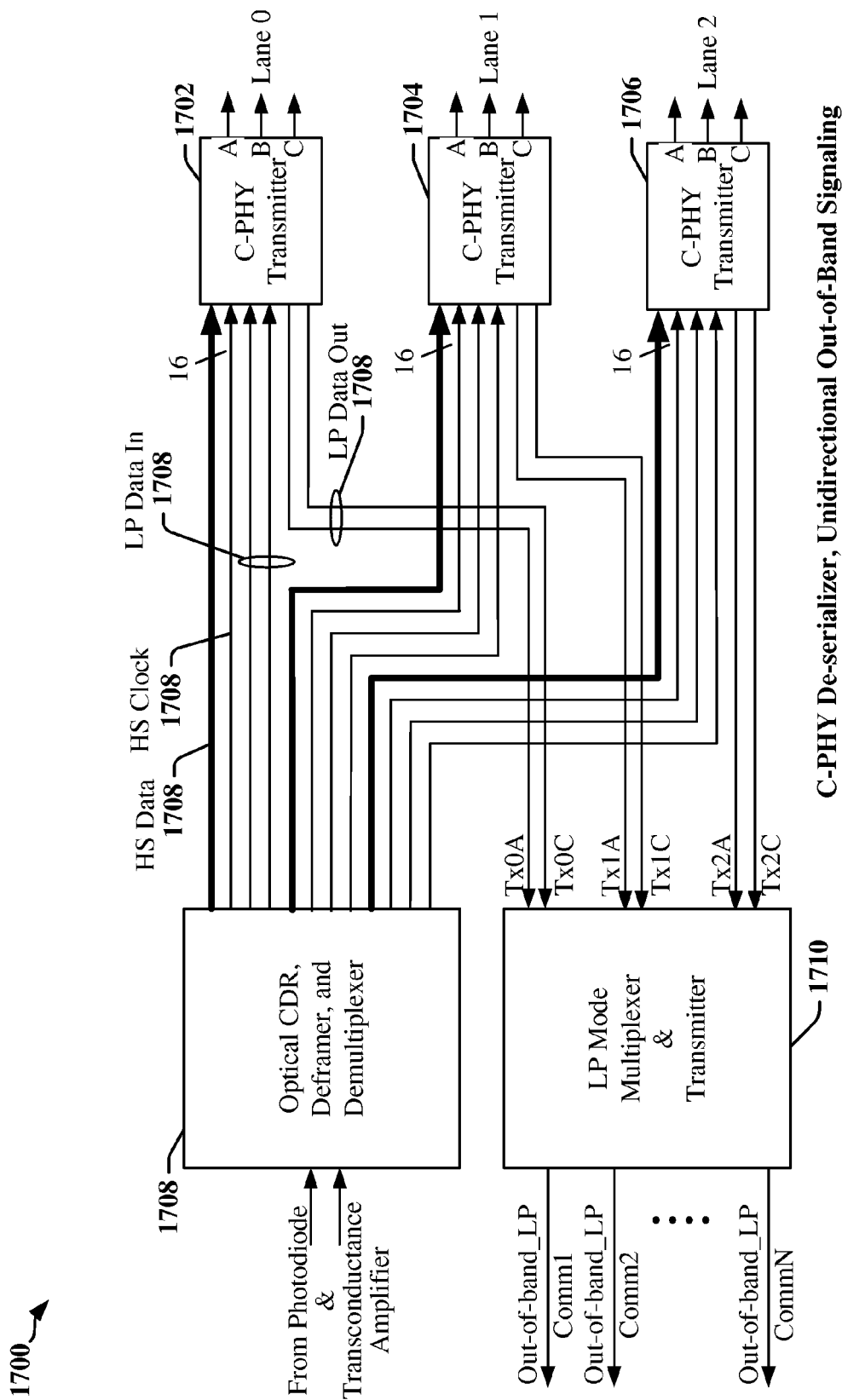
FIG. 17 is a block schematic diagram illustrating a second example of a bridge configuration provided in accordance with certain aspects disclosed herein.

FIG. 17 is a block schematic diagram illustrating a second example of a bridge configuration 1700 provided in accordance with certain aspects disclosed herein. In this configuration 1700, the bridge is configured as a C-PHY de-serializer with unidirectional, out-of-band signaling. The diagram illustrates the connections between C-PHY transmitters 1702, 1704, 1706 and an optical clock and data recovery (CDR), deframer, demultiplexer and driver 1708, which processes the data signal received from the photodiode and TIA, and between the C-PHY transmitters 1702, 1704, 1706 and the low-power interface 1710. The low-power interface 1710 may be configured according to CCI protocols, or another protocol suitable for handling the characteristics of the electrically conductive bus, including the physical length of the bus.

In this configuration 1700, combined high-speed data and forward link LP mode signaling is received from the optical link and is de-framed and de-multiplexed at the CDR, deframer, demultiplexer and driver 1708. LP mode data in the forward direction is sent from the de-multiplexing circuit to the C-PHY transmitter. Reverse LP mode data is received by circuitry inside the C-PHY transmitter and is sent to LP Mode Multiplexing and Transmitter circuits of the LP interface 1710, where the LP mode data is combined in a suitable manner to be sent over the out-of-band LP signals.

Figure 18:
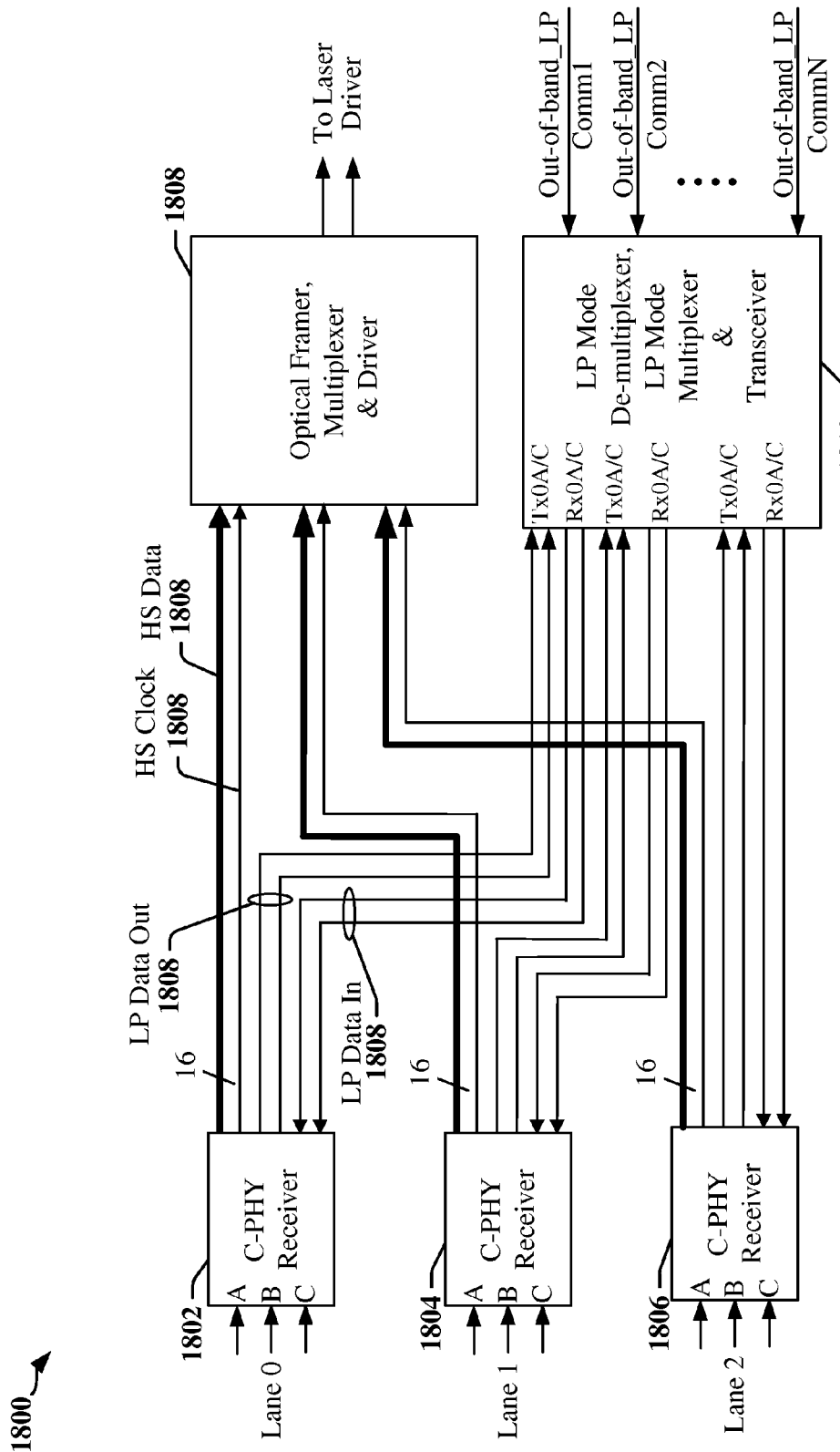
FIG. 18 is a block schematic diagram illustrating a third example of a bridge configuration provided in accordance with certain aspects disclosed herein.

FIG. 18 is a block schematic diagram illustrating a third example of a bridge configuration 1800 provided in accordance with certain aspects disclosed herein. In this configuration 1800, the bridge is configured as a C-PHY serializer with bidirectional, out-of-band signaling. The diagram illustrates the connections between C-PHY receivers 1802, 1804, 1806 and an optical framer, multiplexer and driver 1808, which controls the data signal provided to the Laser driver, and between the C-PHY receivers 1802, 1804, 1806 and the low-power interface 1810. The low-power interface 1810 may be configured according to CCI protocols, or another protocol suitable for handling the characteristics of the electrically conductive bus, including the physical length of the bus.

In this configuration 1800, both forward and reverse LP mode data are sent over the out-of-band auxiliary bus, while high-speed data is transmitted over the optical link. Since the C-PHY and D-PHY LP data is half-duplex, both forward and reverse LP data can share the same out-of-band communication signal wires. As illustrated in the configuration 1800, two or more conductors may be allocated for out-of-band LP communication, and an LP mode de-multiplexer and an LP mode multiplexer can be configured to concentrate the LP signals onto any number of out-of-band signal wires depending upon the maximum signal length and speed capability of the out-of-band interface.

Figure 19:
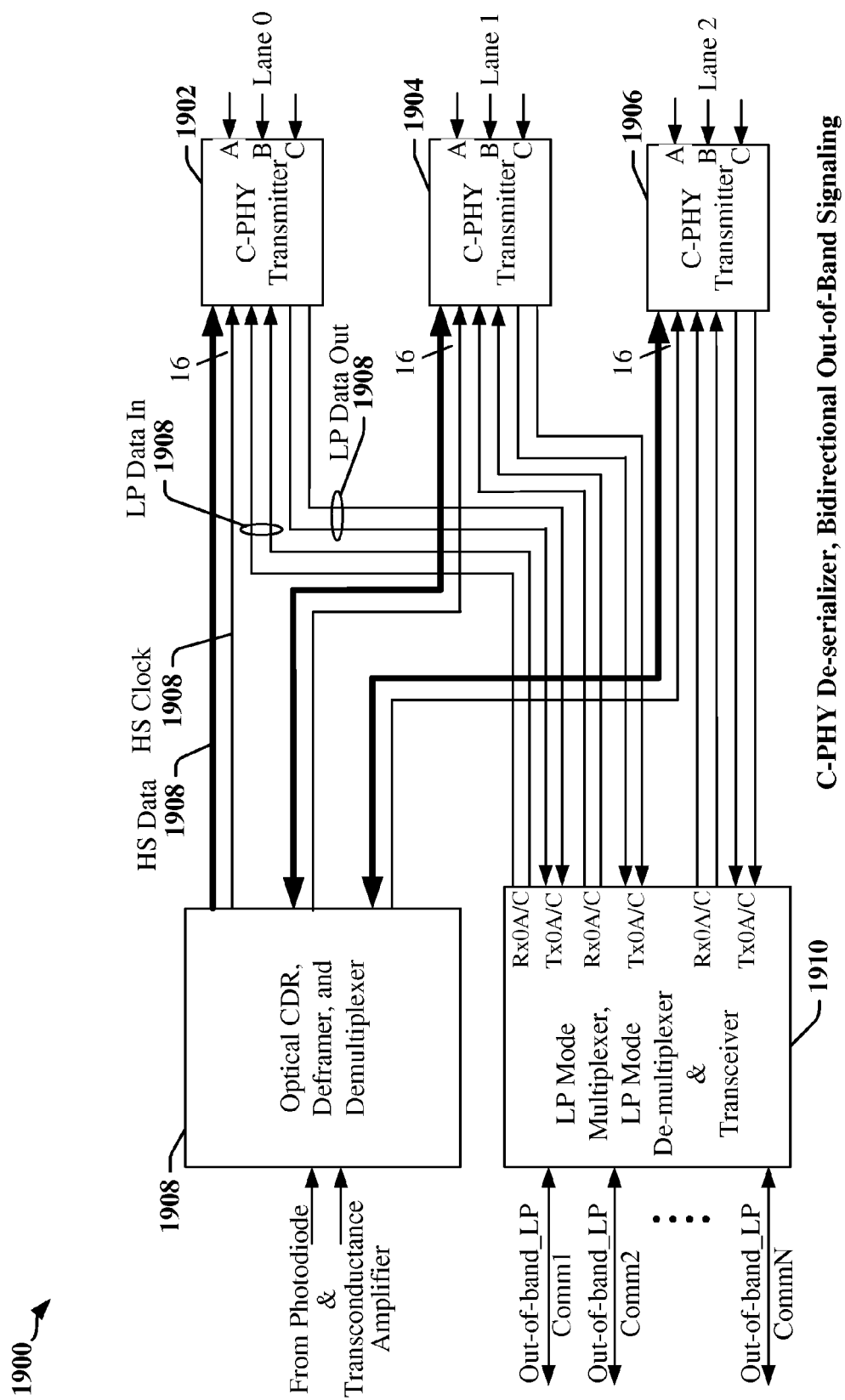
FIG. 19 is a block schematic diagram illustrating a fourth example of a bridge configuration provided in accordance with certain aspects disclosed herein.

FIG. 19 is a block schematic diagram illustrating a fourth example of a bridge configuration 1900 provided in accordance with certain aspects disclosed herein. In this configuration 1900, the bridge is configured as a C-PHY de-serializer with bidirectional, out-of-band signaling. The diagram illustrates the connections between C-PHY transmitters 1902, 1904, 1906 and an optical CDR, deframer, demultiplexer and driver 1908, which processes the data signal received from the photodiode and TIA, and between the C-PHY transmitters 1902, 1904, 1906 and the low-power interface 1910. The low-power interface 1910 may be configured according to CCI protocols, or another protocol suitable for handling the characteristics of the electrically conductive bus, including the physical length of the bus.

In this configuration 1900, high-speed data is received from the optical link and is de-framed and de-multiplexed at the CDR, deframer, demultiplexer and driver 1908. LP mode data in the forward direction is sent from de-multiplexing circuits in the low-power interface 1910 to the C-PHY transmitters 1902, 1904, 1906. Reverse LP mode data is received by circuitry inside the C-PHY transmitters 1902, 1904, 1906 and is processed by multiplexing circuits in the low-power interface 1910 where the LP mode data is combined in a suitable manner to be communicated over the out-of-band LP auxiliary bus. The C-PHY deserializer receives only high-speed data over the optical link, and is configured to send and receive all LP mode data over the out-of-band LP auxiliary bus.

Figure 20:
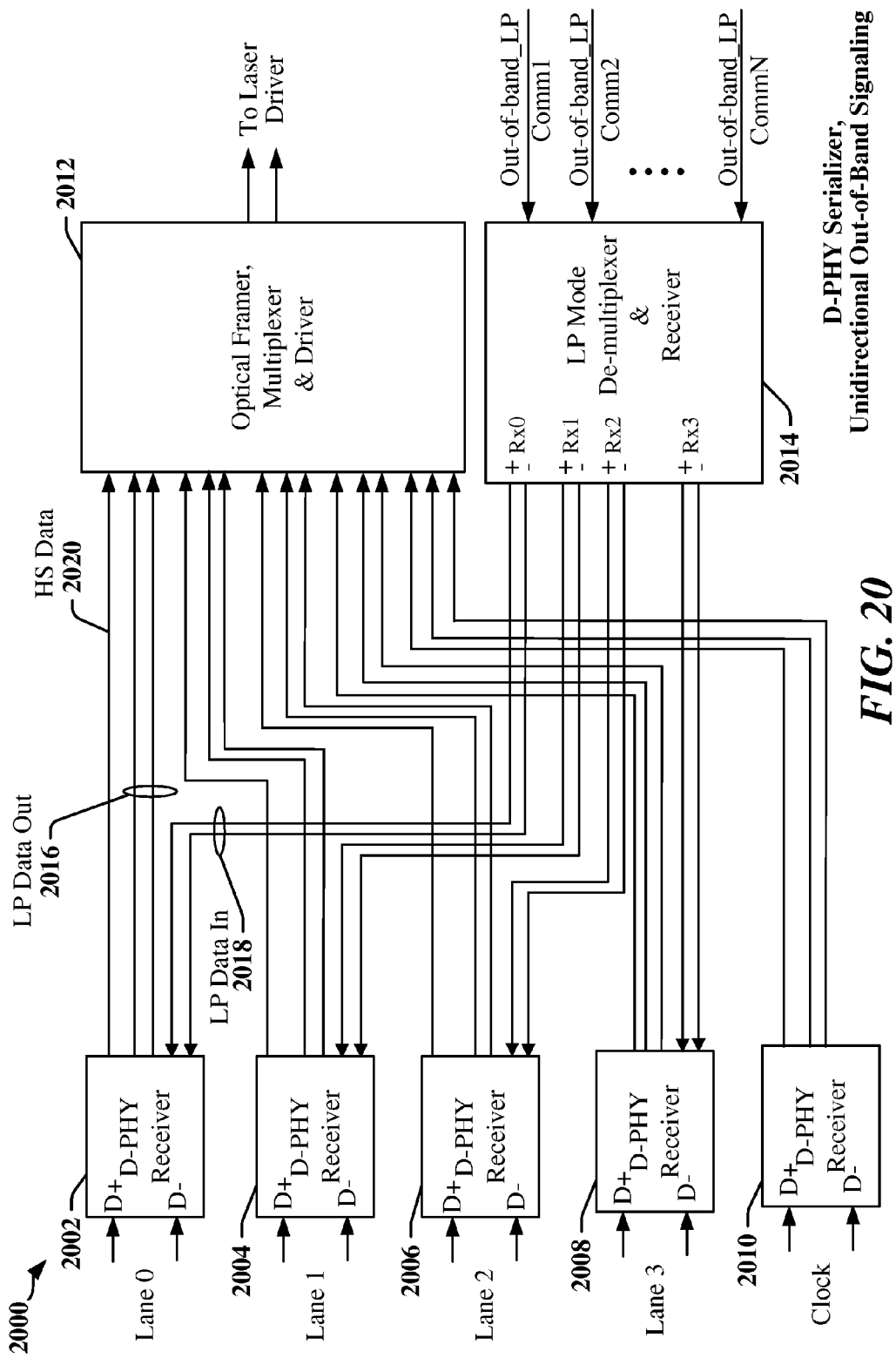
FIG. 20 is a block schematic diagram illustrating a fifth example of a bridge configuration provided in accordance with certain aspects disclosed herein.

FIG. 20 is a block schematic diagram illustrating a fifth example of a bridge configuration 2000 provided in accordance with certain aspects disclosed herein. In this configuration 2000, the bridge is configured as a D-PHY serializer with unidirectional, out-of-band signaling. The diagram illustrates the connections between D-PHY receivers 2002, 2004, 2006, 2008, 2010 and an optical framer, multiplexer and driver circuit 2012, which controls the data signal provided to the Laser driver, and between the D-PHY receivers 2002, 2004, 2006, 2008 and the low-power interface 2014. The low-power interface 2014 may be configured according to CCI protocols, or another protocol suitable for handling the characteristics of the electrically conductive bus, including the physical length of the bus.

This configuration 2000 operates in a manner similar to that of the configuration 1600 in FIG. 16, with configured or reconfigured receiving logic as the D-PHY receivers 2002, 2004, 2006, 2008, 2010. A D-PHY serializer has a separate D-PHY receiver 2010 dedicated for coupling to a clock lane, and this D-PHY receiver 2010 provides a clock signal to the optical framer, multiplexer and driver circuit 2012.

Figure 21:
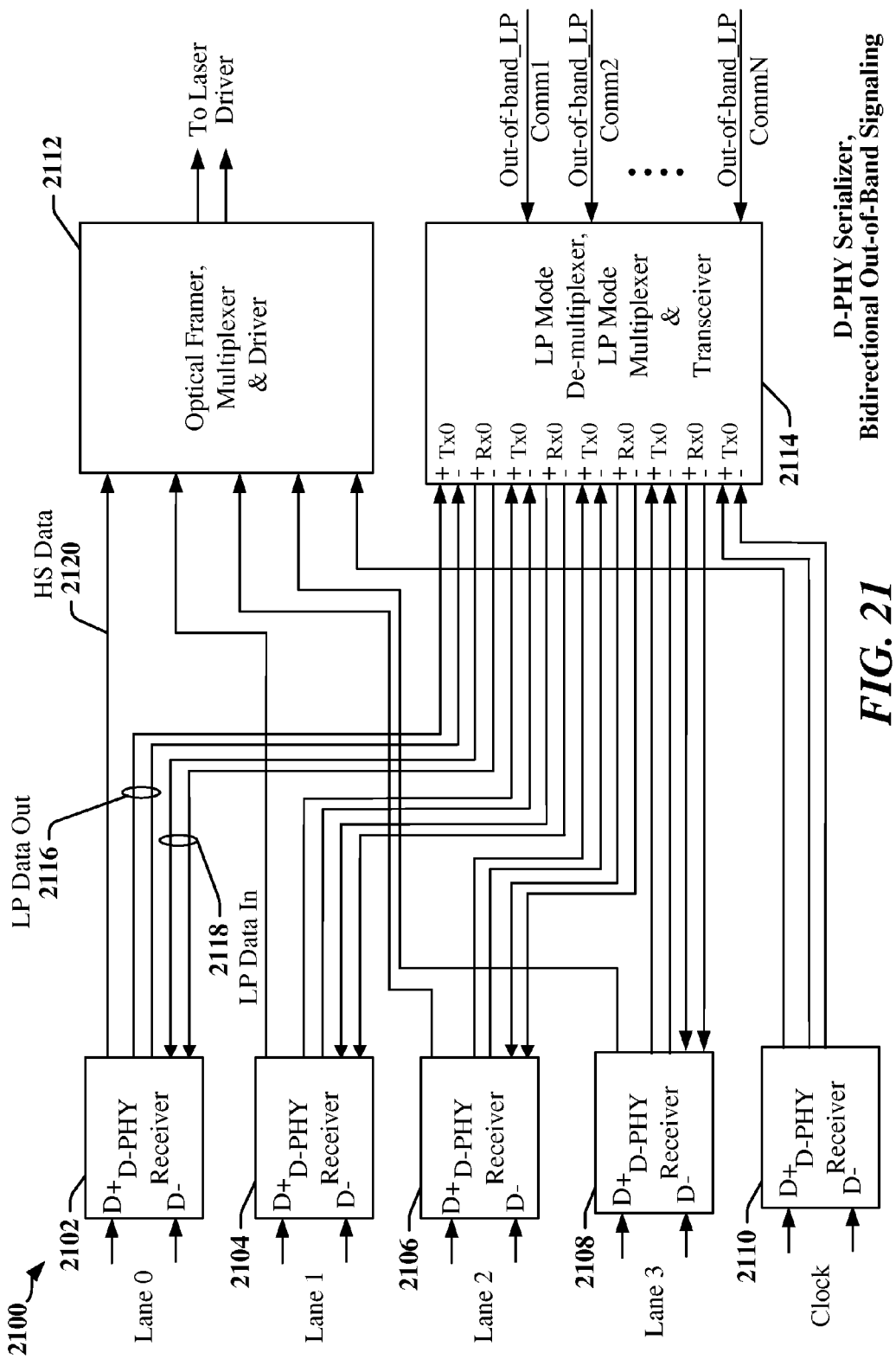
FIG. 21 is a block schematic diagram illustrating a sixth example of a bridge configuration provided in accordance with certain aspects disclosed herein.

FIG. 21 is a block schematic diagram illustrating a sixth example of a bridge configuration 2100 provided in accordance with certain aspects disclosed herein. In this configuration 2100, the bridge is configured as a D-PHY serializer with bidirectional, out-of-band signaling. The diagram illustrates the connections between D-PHY receivers 2102, 2104, 2106, 2108, 2110 and an optical framer, multiplexer and driver circuit 2112, which controls the data signal provided to the Laser driver, and between the D-PHY receivers 2102, 2104, 2106, 2108, 2110 and the low-power interface 2114. The low-power interface 2114 may be configured according to CCI protocols, or another protocol suitable for handling the characteristics of the electrically conductive bus, including the physical length of the bus.

This configuration 2100 operates in a manner similar to that of the configuration 1800 in FIG. 18, with configured or reconfigured receiving logic as the D-PHY receivers 2102, 2104, 2106, 2108, 2110. A D-PHY serializer has a separate D-PHY receiver 2110 dedicated for coupling to a clock lane, and this D-PHY receiver 2110 provides a clock signal to the optical framer, multiplexer and driver circuit 2112.

Additional Descriptions Related to Processing Circuits

Figure 22:
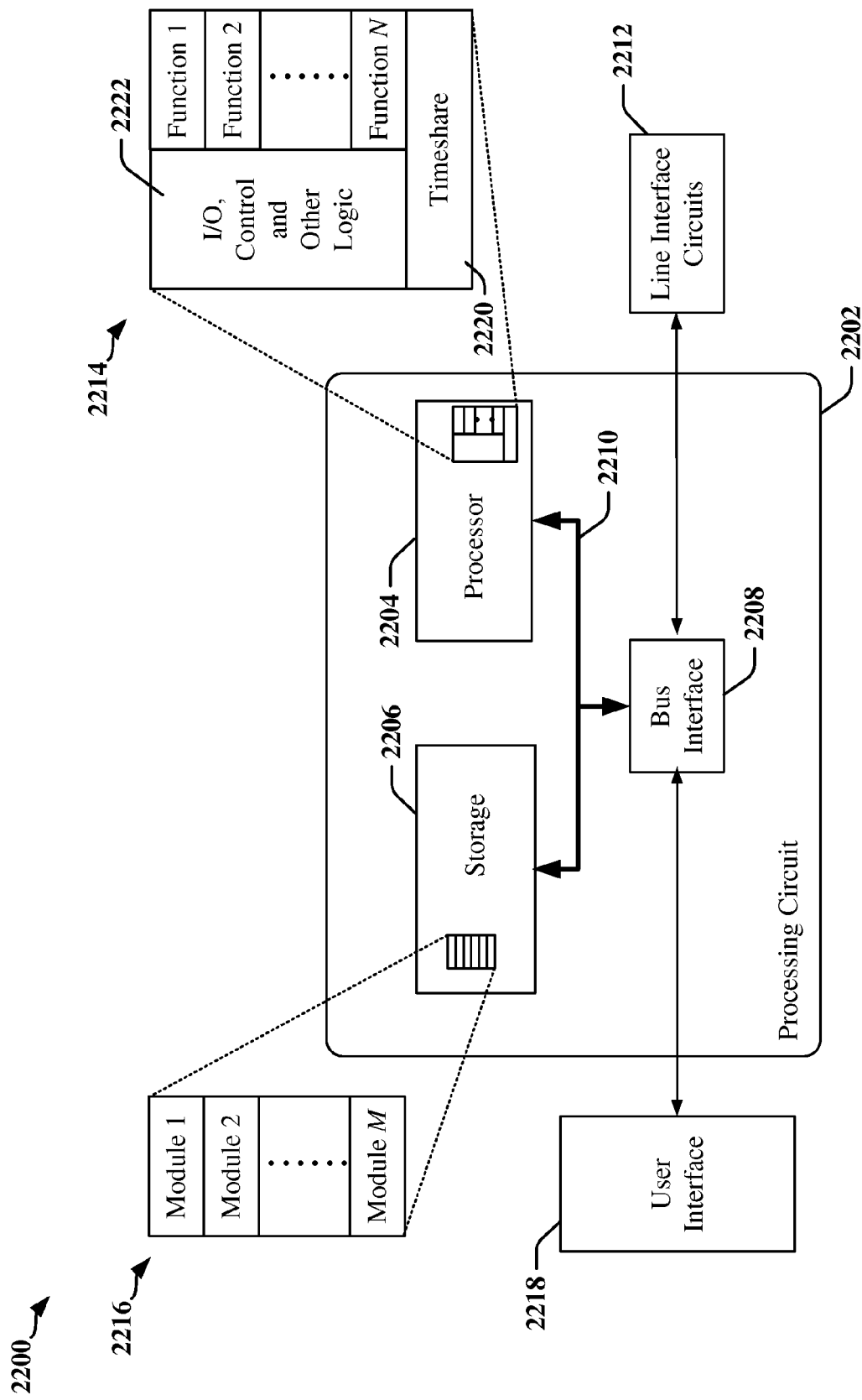
FIG. 22 is a block diagram illustrating an example of an apparatus employing a processing circuit that may be adapted according to certain aspects disclosed herein.

FIG. 22 is a conceptual diagram 2200 illustrating a simplified example of a hardware implementation for an apparatus employing a processing circuit 2202 that may be configured to perform one or more functions disclosed herein. In accordance with various aspects of the disclosure, an element, or any portion of an element, or any combination of elements as disclosed herein may be implemented using the processing circuit 2202. The processing circuit 2202 may include one or more processors 2204 that are controlled by some combination of hardware and software modules. Examples of processors 2204 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2204 may include specialized processors that perform specific functions, and that may be configured, augmented or controlled by one of the software modules 2216. The one or more processors 2204 may be configured through a combination of software modules 2216 loaded during initialization, and further configured by loading or unloading one or more software modules 2216 during operation.

In the illustrated example, the processing circuit 2202 may be implemented with a bus architecture, represented generally by the bus 2210. The bus 2210 may include any number of interconnecting buses and bridges depending on the specific application of the processing circuit 2202 and the overall design constraints. The bus 2210 links together various circuits including the one or more processors 2204, and storage 2206. Storage 2206 may include memory devices and mass storage devices, and may be referred to herein as computer-readable media and/or processor-readable media. The bus 2210 may also link various other circuits such as timing sources, timers, peripherals, voltage regulators, and power management circuits. A bus interface 2208 may provide an interface between the bus 2210 and one or more line interface circuits 2212. A line interface circuit 2212 may be provided for each networking technology supported by the processing circuit. In some instances, multiple networking technologies may share some or all of the circuitry or processing modules found in a line interface circuit 2212. Each line interface circuit 2212 provides a means for communicating with various other apparatus over a transmission medium. Depending upon the nature of the apparatus, a user interface 2218 (e.g., keypad, display, speaker, microphone, joystick) may also be provided, and may be communicatively coupled to the bus 2210 directly or through the bus interface 2208.

A processor 2204 may be responsible for managing the bus 2210 and for general processing that may include the execution of software stored in a computer-readable medium that may include the storage 2206. In this respect, the processing circuit 2202, including the processor 2204, may be used to implement any of the methods, functions and techniques disclosed herein. The storage 2206 may be used for storing data that is manipulated by the processor 2204 when executing software, and the software may be configured to implement any one of the methods disclosed herein.

One or more processors 2204 in the processing circuit 2202 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2206 or in an external computer readable medium. The external computer-readable medium and/or storage 2206 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium and/or storage 2206 may also include, by way of example, a carrier wave, a transmission line, and any other suitable medium for transmitting software and/or instructions that may be accessed and read by a computer. Computer-readable medium and/or the storage 2206 may reside in the processing circuit 2202, in the processor 2204, external to the processing circuit 2202, or be distributed across multiple entities including the processing circuit 2202. The computer-readable medium and/or storage 2206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2206 may maintain software maintained and/or organized in loadable code segments, modules, applications, programs, etc., which may be referred to herein as software modules 2216. Each of the software modules 2216 may include instructions and data that, when installed or loaded on the processing circuit 2202 and executed by the one or more processors 2204, contribute to a run-time image 2214 that controls the operation of the one or more processors 2204. When executed, certain instructions may cause the processing circuit 2202 to perform functions in accordance with certain methods, algorithms and processes described herein.

Some of the software modules 2216 may be loaded during initialization of the processing circuit 2202, and these software modules 2216 may configure the processing circuit 2202 to enable performance of the various functions disclosed herein. For example, some software modules 2216 may configure internal devices and/or logic circuits 2222 of the processor 2204, and may manage access to external devices such as the line interface circuit 2212, the bus interface 2208, the user interface 2218, timers, mathematical coprocessors, and so on. The software modules 2216 may include a control program and/or an operating system that interacts with interrupt handlers and device drivers, and that controls access to various resources provided by the processing circuit 2202. The resources may include memory, processing time, access to the line interface circuit 2212, the user interface 2218, and so on.

One or more processors 2204 of the processing circuit 2202 may be multifunctional, whereby some of the software modules 2216 are loaded and configured to perform different functions or different instances of the same function. The one or more processors 2204 may additionally be adapted to manage background tasks initiated in response to inputs from the user interface 2218, the line interface circuit 2212, and device drivers, for example. To support the performance of multiple functions, the one or more processors 2204 may be configured to provide a multitasking environment, whereby each of a plurality of functions is implemented as a set of tasks serviced by the one or more processors 2204 as needed or desired. In one example, the multitasking environment may be implemented using a timesharing program 2220 that passes control of a processor 2204 between different tasks, whereby each task returns control of the one or more processors 2204 to the timesharing program 2220 upon completion of any outstanding operations and/or in response to an input such as an interrupt. When a task has control of the one or more processors 2204, the processing circuit is effectively specialized for the purposes addressed by the function associated with the controlling task. The timesharing program 2220 may include an operating system, a main loop that transfers control on a round-robin basis, a function that allocates control of the one or more processors 2204 in accordance with a prioritization of the functions, and/or an interrupt driven main loop that responds to external events by providing control of the one or more processors 2204 to a handling function.

Figure 23:
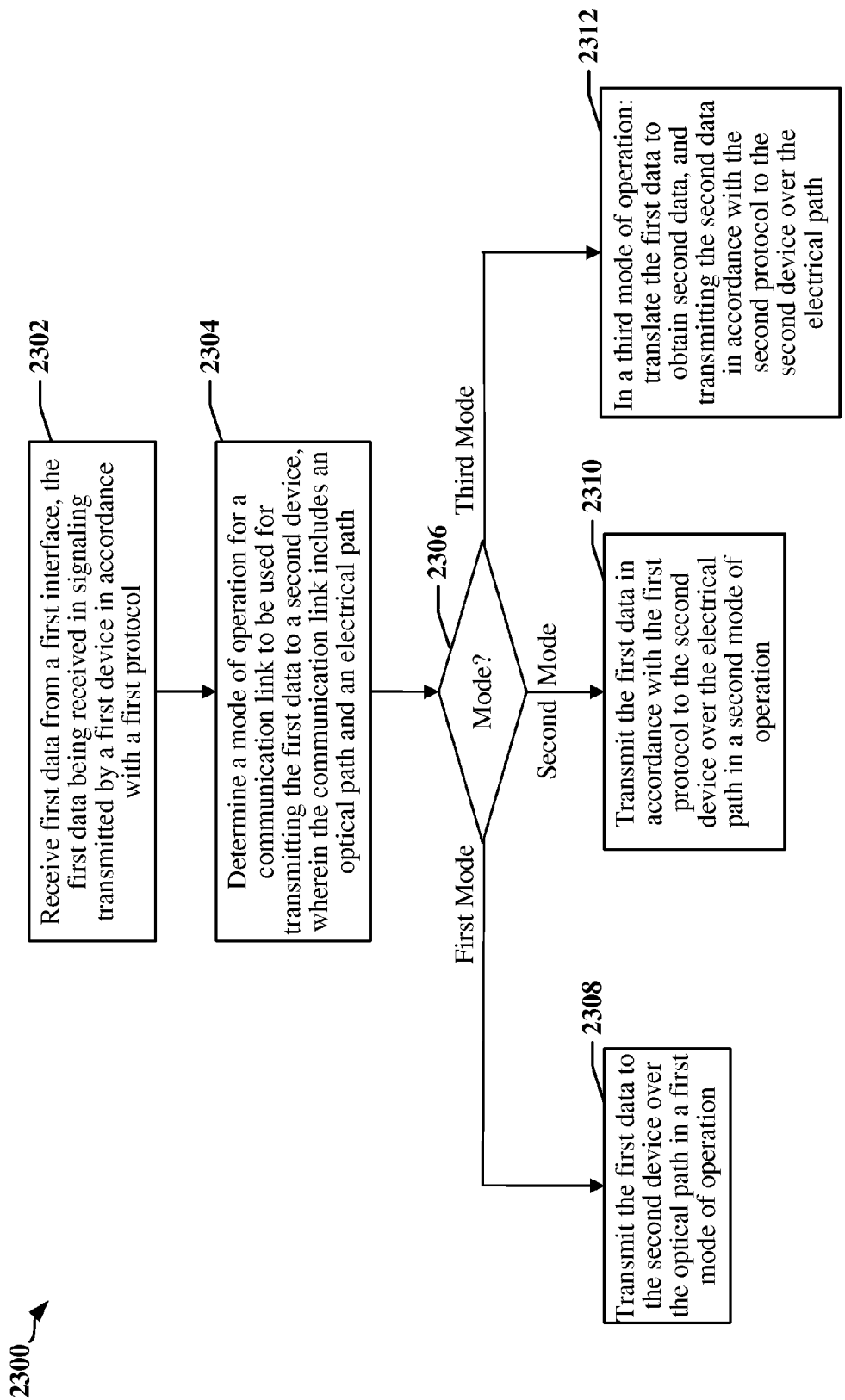
FIG. 23 is a flow chart of a data transfer method operational on one of two devices in an apparatus.

FIG. 23 is a flow chart 2300 of a method operational on one of two devices in a terminal.

At block 2302, first data is received from a first interface. The first data may be received in signaling transmitted by a first device in accordance with a first protocol.

At block 2304, a mode of operation may be determined for a communication link to be used for transmitting the first data to a second device. The communication link may include an optical path and an electrical path.

At block 2306, the mode determines how data transmissions are to be handled. At block 2308, the first data is transmitted to the second device over the optical path in a first mode of operation. At block 2310, the first data is transmitted in accordance with the first protocol to the second device over the electrical path in a second mode of operation.

At block 2312, data transmissions are handled in accordance with a third mode of operation. In the third mode, the first data is translated to obtain second data. The second data may then be transmitted to the second device over the electrical path, in accordance with the second protocol.

In some examples, one or more characteristics of a plurality of connectors of the electrical path are determined. The one or more characteristics may include a length of the plurality of connectors. The second protocol may be selected based on the one or more characteristics. In a first signaling mode, third data communicated between a second interface and the second device may be relayed without translation. In a second signaling mode, the third data received from a second interface in accordance with a third protocol may be translated to obtain fourth data. The fourth data may be transmitted to the second device in accordance with the fourth protocol, and over the electrical path.

In some examples, a data rate associated with the first data may be determined. The second protocol may be selected based on the data rate. In the third mode of operation, a mode of signaling used for communicating the second data may be selected based on the data rate associated with the first data and one or more characteristics of a plurality of connectors of the electrical path. The one or more characteristics may include a length of one or more connectors in the plurality of connectors, proximity of two or more connectors in the plurality of connectors, common-mode rejection characteristics of two or more connectors in the plurality of connectors, and/or characteristics associated with physical routing of one or more connectors in the plurality of connectors.

In some examples, the second data may be transmitted over the electrical path at a lower data rate than a data rate at which the first data is received from the first interface. In some instances, the second protocol may be a CCI protocol, an I2C protocol or a proprietary protocol.

In some examples, third data received from a second interface may be relayed to the second device over a first plurality of connectors in the electrical path. In the third mode of operation, the second data are transmitted on a second plurality of connectors in the electrical path, the second plurality of connectors being different from the first plurality of connectors. In the second mode of operation, the first data may be transmitted on a first group of connectors of the electrical path and the third data may be transmitted on a second group of connectors of the electrical path. The first group of connectors and the second group of connectors may include one or more different connectors. The first group of connectors may include no connectors found in the second group of connectors.

Figure 24:
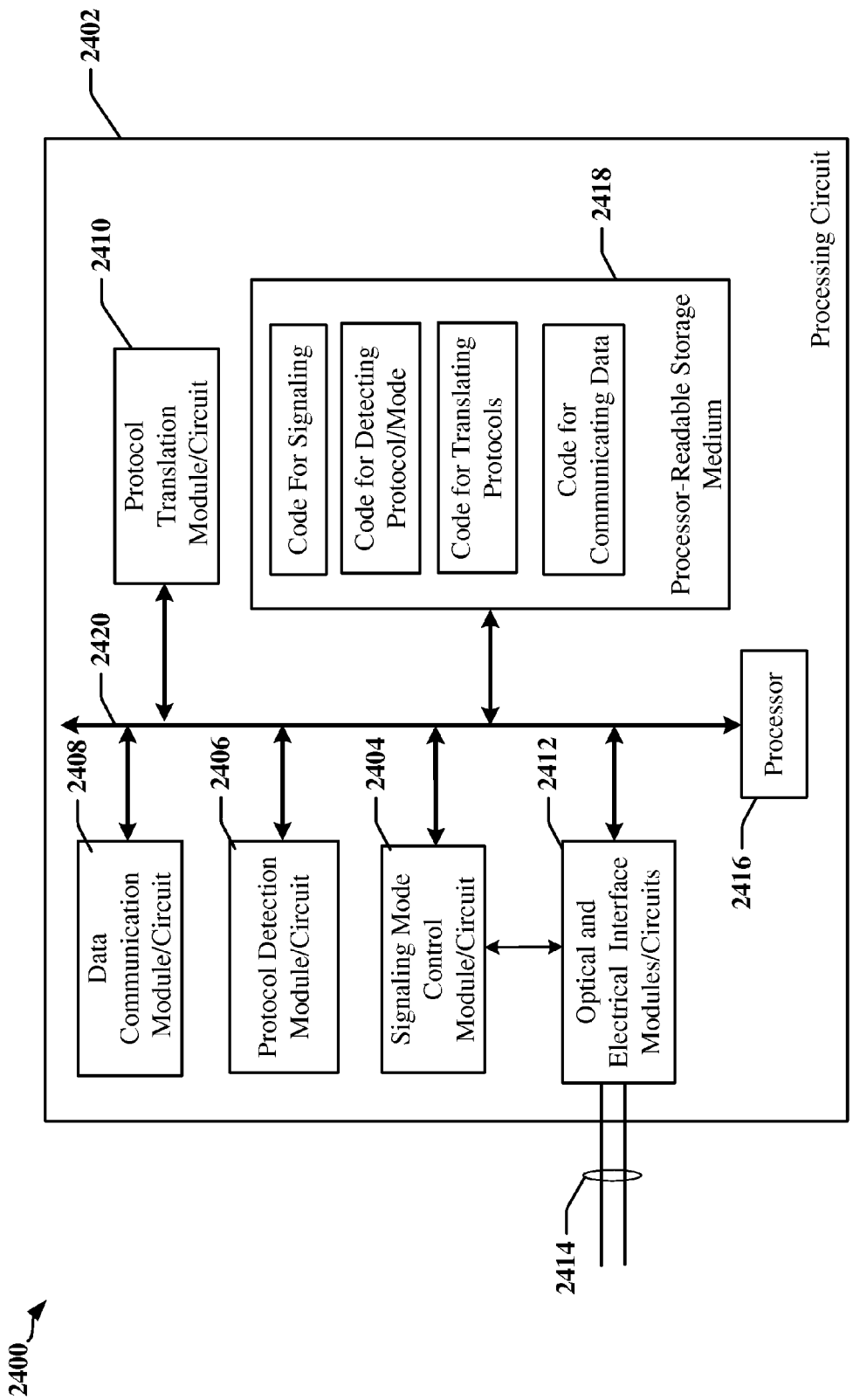
FIG. 24 is a diagram illustrating an example of a hardware implementation for an apparatus employing a processing employing a processing circuit adapted according to certain aspects disclosed herein.

FIG. 24 is a diagram illustrating a simplified example of a hardware implementation for an apparatus 2400 employing a processing circuit 2402. The processing circuit typically has a processor 2416 that may include one or more of a microprocessor, microcontroller, digital signal processor, a sequencer and a state machine. The processing circuit 2402 may be implemented with a bus architecture, represented generally by the bus 2420. The bus 2420 may include any number of interconnecting buses and bridges depending on the specific application of the processing circuit 2402 and the overall design constraints. The bus 2420 links together various circuits including one or more processors and/or hardware modules, represented by the processor 2416, the modules or circuits 2404, 2406, 2408, and 2410, interface circuits 2412 configurable to communicate over optical and electrical connectors or wires 2414 and the computer-readable storage medium 2418. The bus 2420 may also link various other circuits such as timing sources, peripherals, voltage regulators, and power management circuits, which are well known in the art, and therefore, will not be described any further.

The processor 2416 is responsible for general processing, including the execution of software stored on the computer-readable storage medium 2418. The software, when executed by the processor 2416, causes the processing circuit 2402 to perform the various functions described supra for any particular apparatus. The computer-readable storage medium 2418 may also be used for storing data that is manipulated by the processor 2416 when executing software, including data decoded from symbols transmitted over the connectors or wires 2414, which may be configured as data lanes and clock lanes. The processing circuit 2402 further includes at least one of the modules 2404, 2406, 2408, and 2410. The modules 2404, 2406, 2408, and 2410 may be software modules running in the processor 2416, resident/stored in the computer-readable storage medium 2418, one or more hardware modules coupled to the processor 2416, or some combination thereof. The 2404, 2406, 2408, and/or 2410 may include microcontroller instructions, state machine configuration parameters, or some combination thereof.

In one configuration, the apparatus 2400 for data communication includes modules and/or circuits 2408 configured to receive first data from a first interface, the first data being received in signaling transmitted by the first IC device in accordance with a first protocol, modules and/or circuits 2404, 2406 configured to determine a mode of operation for communicating between a first IC device and a second IC device, modules and/or circuits 2408, 2410, 2412 configured to transmit the first data to the second device over an optical medium in a first mode of operation, transmit the first data in accordance with the first protocol to the second IC device using two or more of the plurality of electrical connectors in a second mode of operation, and in a third mode of operation, translate the first data to obtain second data, and transmit the second data in accordance with the second protocol to the second device using the plurality of electrical connectors.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A data transfer method, comprising:
    receiving first data from a first interface, the first data being received in signaling transmitted by a first device in accordance with a first protocol;
    determining a mode of operation for a communication link to be used for transmitting the first data to a second device, wherein the communication link includes an optical path and an electrical path;
    transmitting the first data to the second device over the optical path in a first mode of operation;
    transmitting the first data in accordance with the first protocol to the second device over the electrical path in a second mode of operation; and
    in a third mode of operation:
        translating the first data to obtain second data, and
        transmitting the second data in accordance with a second protocol to the second device over the electrical path.

2. The data transfer method of claim 1, further comprising:
    determining one or more characteristics of a plurality of connectors of the electrical path, the one or more characteristics including a length of the plurality of connectors; and
    selecting the second protocol based on the one or more characteristics.

3. The data transfer method of claim 1, further comprising:
    determining a data rate associated with the first data; and
    selecting the second protocol based on the data rate.

4. The data transfer method of claim 1, further comprising:
    in the third mode of operation, determining a mode of signaling used for communicating the second data based on a data rate associated with the first data and one or more characteristics of a plurality of connectors of the electrical path, the one or more characteristics including a length of the plurality of connectors.

5. The data transfer method of claim 1, wherein the second data is transmitted over the electrical path at a lower data rate than a data rate at which the first data is received from the first interface.

6. The data transfer method of claim 1, wherein the second protocol is a Camera Control Interface (CCI) protocol or an Inter-Integrated Circuit (I2C) protocol.

7. The data transfer method of claim 1, further comprising:
    relaying third data received from a second interface to the second device over a first plurality of connectors in the electrical path.

8. The data transfer method of claim 7, wherein in the third mode of operation, the second data are transmitted on a second plurality of connectors in the electrical path, the second plurality of connectors being different from the first plurality of connectors.

9. An apparatus comprising:
    an optical medium adapted to communicate information in optical signals;
    a first integrated circuit (IC) device coupled to the optical medium and adapted to transmit the optical signals;
    a second IC device coupled to the optical medium and adapted to receive the optical signals;
    an electrical path comprising a plurality of electrical connectors coupling the first IC device and the second IC device,
    wherein the first IC device and the second IC device include a bridge circuit configured to:
        receive first data from a first interface, the first data being received in signaling transmitted by the first IC device in accordance with a first protocol;
        determine a mode of operation for communicating between the first IC device and the second IC device;

transmit the first data to the second IC device over the optical medium in a first mode of operation;

transmit the first data in accordance with the first protocol to the second IC device using two or more of the plurality of electrical connectors in a second mode of operation; and in a third mode of operation, translate the first data to obtain second data, and transmit the second data in accordance with a second protocol to the second IC device using the plurality of electrical connectors.

10. The apparatus of claim 9, wherein the mode of operation is determined based on one or more characteristics of a plurality of connectors of the electrical path, the one or more characteristics including a length of the plurality of connectors.

11. The apparatus of claim 9, wherein the bridge circuit selects the second protocol based on one or more characteristics of a plurality of connectors of the electrical path, the one or more characteristics including a length of the plurality of connectors.

12. The apparatus of claim 9, wherein the bridge circuit is configured to select a signaling mode for out-of-band communications based on one or more characteristics of a plurality of connectors of the electrical path, the one or more characteristics including a length of the plurality of connectors.

13. The apparatus of claim 12, wherein the bridge circuit is configured to transmit first data on a first group of connectors of the electrical path and to transmit the second data on a second group of connectors of the electrical path, the first group of connectors being different from the second group of connectors.

14. The apparatus of claim 9, wherein the second protocol is a Camera Control Interface (CCI) protocol or an Inter-Integrated Circuit (I2C) protocol.

15. A bridge circuit comprising:
means for communicating first information in optical signals through an optical medium, including a first interface circuit coupled to the optical medium;
means for communicating second information in electrical signals through a plurality of electrical connectors, including a second interface circuit coupled to the plurality of electrical connectors;
means for selectively coupling one or more sources of input data with the first interface circuit and the second interface circuit, including a processing circuit configured to:
receive first data encoded in accordance with a first protocol;
determine a mode of operation for communicating the first data;
transmit the first data over the optical medium in a first mode of operation;
transmit the first data in accordance with the first protocol using two or more of the plurality of electrical connectors in a second mode of operation; and
in a third mode of operation, translate the first data to obtain second data, and transmit the second data in accordance with a second protocol using the plurality of electrical connectors.

16. The bridge circuit of claim 15, wherein the mode of operation is determined based on one or more characteristics of the plurality of electrical connectors, the one or more characteristics including a length of the plurality of electrical connectors.

17. The bridge circuit of claim 15, wherein the second protocol is selected based on one or more characteristics of the plurality of electrical connectors, the one or more characteristics including a length of the plurality of electrical connectors.

18. The bridge circuit of claim 15, wherein the bridge circuit is configured to select a signaling mode for out-of-band communications based on a data rate associated with the first data.

19. The bridge circuit of claim 15, wherein the first data is transmitted on a first group of connectors of the plurality of electrical connectors and the second data is transmitted on a second group of connectors of the plurality of electrical connectors, the first group of connectors being different from the second group of connectors.

20. The bridge circuit of claim 15, wherein the second protocol is a Camera Control Interface (CCI) protocol or an Inter-Integrated Circuit (I2C) protocol.

21. A processor readable storage medium comprising code for:
receiving first data from a first interface, the first data being received in signaling transmitted by a first device in accordance with a first protocol;
determining a mode of operation for a communication link to be used for transmitting the first data to a second device, wherein the communication link includes an optical path and an electrical path;
transmitting the first data to the second device over the optical path in a first mode of operation;
transmitting the first data in accordance with the first protocol to the second device over the electrical path in a second mode of operation; and
in a third mode of operation:
translating the first data to obtain second data, and
transmitting the second data in accordance with a second protocol to the second device over the electrical path.

22. The processor readable storage medium of claim 21, further comprising code for:
determining one or more characteristics of a plurality of connectors of the electrical path, the one or more characteristics including a length of the plurality of connectors; and
selecting the second protocol based on the one or more characteristics.

23. The processor readable storage medium of claim 21, further comprising code for:
determining a data rate associated with the first data; and
selecting the second protocol based on the data rate.

24. The processor readable storage medium of claim 21, further comprising code for:
in the third mode of operation, determining a mode of signaling used for communicating the second data based on a data rate associated with the first data and one or more characteristics of a plurality of connectors of the electrical path, the one or more characteristics including a length of the plurality of connectors.

25. The processor readable storage medium of claim 21, wherein the second data is transmitted over the electrical path at a lower data rate than a data rate at which the first data is received from the first interface.

26. The processor readable storage medium of claim 21, wherein the second protocol is a Camera Control Interface (CCI) protocol or an Inter-Integrated Circuit (I2C) protocol.

27. The processor readable storage medium of claim 21, further comprising code for:
relaying third data received from a second interface to the second device over a first plurality of connectors in the electrical path.

28. The processor readable storage medium of claim 27, wherein in the third mode of operation, the second data are transmitted on a second plurality of connectors in the electrical path, the second plurality of connectors being different from the first plurality of connectors.

\* \* \* \* \*